US007991535B2

(12) United States Patent
Gittere

(10) Patent No.: US 7,991,535 B2
(45) Date of Patent: Aug. 2, 2011

(54) PORTABLE, PALM-SIZED DATA ACQUISITION SYSTEM FOR USE IN INTERNAL COMBUSTION ENGINES AND INDUSTRY

(76) Inventor: Robert J. Gittere, West Falls, NY (US)

( * ) Notice: Subject to any disclaimer, the term of this patent is extended or adjusted under 35 U.S.C. 154(b) by 0 days.

(21) Appl. No.: 12/367,536

(22) Filed: Feb. 8, 2009

(65) Prior Publication Data

US 2009/0204310 A1 Aug. 13, 2009

Related U.S. Application Data

(60) Provisional application No. 61/027,191, filed on Feb. 8, 2008.

(51) Int. Cl.
*G06G 7/70* (2006.01)
*G06F 19/00* (2006.01)

(52) U.S. Cl. ......................... 701/102; 701/101; 701/108

(58) Field of Classification Search .......... 701/101–103, 701/108, 110, 114
See application file for complete search history.

(56) References Cited

U.S. PATENT DOCUMENTS

| | | | | |
|---|---|---|---|---|
| 5,067,463 | A * | 11/1991 | Remboski et al. | 123/406.28 |
| 5,428,769 | A * | 6/1995 | Glaser et al. | 700/4 |
| 5,854,904 | A * | 12/1998 | Brown | 710/100 |
| 6,438,511 | B1 * | 8/2002 | McKenzie et al. | 702/179 |
| 6,456,927 | B1 * | 9/2002 | Frankowski et al. | 701/111 |
| 6,499,114 | B1 * | 12/2002 | Almstead et al. | 714/25 |
| 6,574,542 | B1 * | 6/2003 | Kurtzberg et al. | 701/70 |
| 6,917,875 | B2 * | 7/2005 | Boysen et al. | 701/114 |
| 7,254,477 | B1 * | 8/2007 | Banks | 701/114 |
| 7,505,847 | B2 * | 3/2009 | Burkatovsky | 701/114 |
| 7,539,610 | B2 * | 5/2009 | Imada et al. | 703/28 |
| 7,593,808 | B2 * | 9/2009 | Banks | 701/114 |
| 2006/0215959 | A1 * | 9/2006 | McCarthy et al. | 385/37 |

* cited by examiner

*Primary Examiner* — John T Kwon
*Assistant Examiner* — Johnny H Hoang
(74) *Attorney, Agent, or Firm* — Patricia M. Costanzo

(57) ABSTRACT

A portable, palm-sized, Data Acquisition System including an apparatus to measure engine thermo-events, a wiring harness having signals for collecting, recording, and transmitting engine performance data and identifying the engine being monitored, and an acquisition server (DAS) for collecting and transmitting data from the thermo-measuring apparatus and wiring harness, is taught. There also is a Web-server, an Ethernet network interface, software, an SPI bus interface requiring only three signals for communication, and a software system that records, stores, processes, transmits, displays, and analyzes data pertaining to any combustion engine performance and other industrial engine applications. The use of fiber optic cable for electronic communication provides for the DAS to be installed a distance from the engine. The DAS is share-able between several engines, is user friendly, is low cost to manufacture, affordable, and has a flexible signaling feature that works with systems that use, and do not use, telemetry.

12 Claims, 15 Drawing Sheets

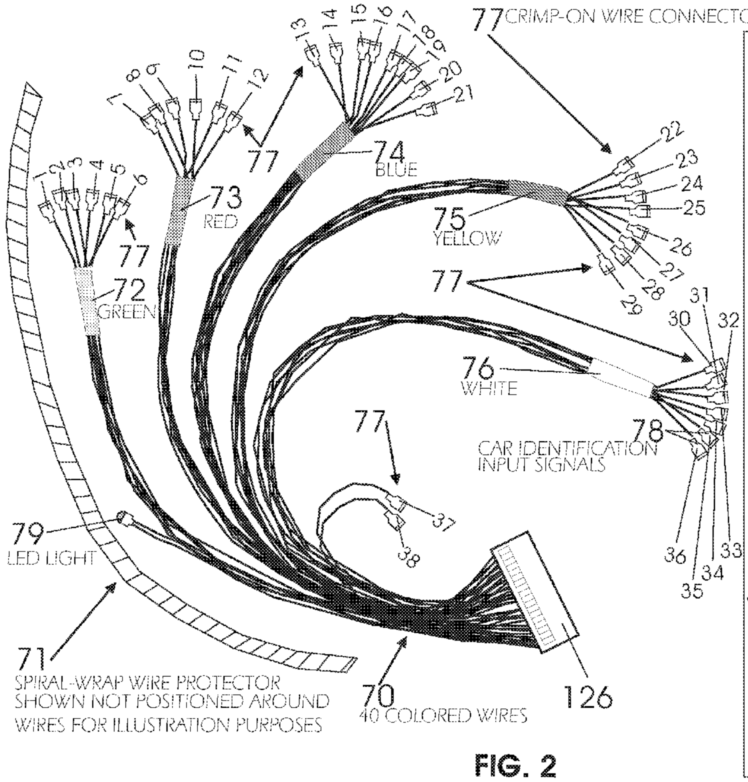

| WIRE | COLOR | PRIMARY USE |
|---|---|---|
| GREEN GROUP | | |
| 1 | WHITE | TACHOMETER INPUT |
| 2 | GREEN | TACHOMETER INPUT |
| 3 | BLUE | TACHOMETER INPUT |
| 4 | VIOLET | SOLENOID SENSOR |
| 5 | BROWN | SOLENOID SENSOR |
| 6 | ORANGE | START/STOP RECORD |
| RED GROUP | | |
| 7 | WHITE | DIGITAL DISPLAY OUTPUT |
| 8 | GREEN | DIGITAL DISPLAY OUTPUT |
| 9 | BLUE | PRIMARY IGNITION INPUT |
| 10 | VIOLET | CRANK POSITION INPUT |
| 11 | BLACK | DIGITAL GROUND OUT |
| 12 | YELLOW | +5V DIGITAL POWER OUT |
| BLUE GROUP | | |
| 13 | WHITE | ANALOG INPUT SE/DE |
| 14 | GREEN | ANALOG INPUT SE/DE |
| 15 | BLUE | ANALOG INPUT SE/DE |
| 16 | VIOLET | ANALOG INPUT SE/DE |
| 17 | BROWN | ANALOG INPUT SE |
| 18 | YELLOW | +5V ANALOG POWER OUT |
| 19 | YELLOW | +5V ANALOG POWER OUT |
| 20 | BLACK | ANALOG GROUND OUT |
| 21 | BLACK | ANALOG GROUND OUT |
| YELLOW GROUP | | |
| 22 | WHITE | ANALOG OR DIGITAL |
| 23 | GREEN | ANALOG OR DIGITAL |
| 24 | BLUE | ANALOG OR DIGITAL |
| 25 | VIOLET | ANALOG OR DIGITAL |
| 26 | BROWN | ANALOG OR DIGITAL |
| 27 | ORANGE | ANALOG OR DIGITAL |
| 28 | GRAY | ANALOG OR DIGITAL |
| 29 | BLACK | ANALOG GROUND OUT |
| WHITE GROUP | | |
| 30 | WHITE | ANALOG OR DIGITAL |
| 31 | GREEN | ANALOG OR DIGITAL |
| 32 | BLUE | ANALOG OR DIGITAL |
| 33 | VIOLET | ANALOG OR DIGITAL |
| 34 | BROWN | ANALOG OR DIGITAL |
| 35 | ORANGE | CAR IDENTITY I/O LINE IN |
| 36 | GRAY | CAR IDENTITY I/O LINE IN |
| 37 | RED | +12V POWER IN |
| 38 | BLACK | GROUND IN |

FIG. 2

HEADER BANK - SPI TO GATED CLOCK AND FIBER OPTIC INTERFACE ADAPTER

Dataclutch Main Program

Support for multiple cars, each with its own wiring, sensors, and settings

How the user should use the "car identity" I/O line or lines: By simply wiring them to another wire (the ground) or leaving them unconnected, and wiring each car differently. Each wiring pattern corresponds to a number _ a car number.

Main Loop continued

Support for multiple cars, each with its own wiring, sensors, and settings

PORTABLE, PALM-SIZED DATA ACQUISITION SYSTEM FOR USE IN INTERNAL COMBUSTION ENGINES AND INDUSTRY

CROSS-REFERENCE TO RELATED APPLICATIONS

This application claims the benefit of Application No. 61/027,191 filed Feb. 8, 2008.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

FIELD OF INVENTION

The claimed invention relates generally to data acquisition and, more particularly, to a Data Acquisition System providing for real-time, and other time, measurements of engine performance parameters that is portable, palm-sized, and includes a device to measure engine thermo-events, an engine signal wiring harness and a variety of electronic signals for collecting, recording, and transmitting data relevant to engine performance and to identify the engine from which the data is being collected, a portable, non-engine specific data acquisition server (DAS) for collection and transmission of the data collected by the device to measure engine thermo-events and the vehicle wiring harness, in addition to a Web-server system, an Ethernet network interface, dedicated software, a unique SPI bus interface design that requires only three signals for communication, and a unique software system that allows: recording, storing, processing, transmitting, displaying, and analyzing data pertaining to the parameters of engine performance, as well as other providing for collection of similar data from various industrial applications. The DAS may be installed in nearly any area of the vehicle because the cables connecting the header banks to the DAS are fiber optic to reduce signal distortion. The DAS may be used by a number of engines and is designed to work with systems that can both use, and not use, telemetry.

BACKGROUND

The background information discussed below is presented to better illustrate the novelty and usefulness of the claimed invention. This background information is not admitted prior art.

A data acquisition system measures, saves, and stores various parameters that may be observed while an engine, or other machine, functions. For example, a data acquisition system is installed on a race car to measure RPM and vehicle speed. This data is collected for analysis in hopes of improving the performance of the machine. Data acquisition systems are generally electronic including both hardware and software. The hardware part is made of sensors, various types of cables, and electronic components, such as a memory device that collects and stores information. The software part includes data acquisition logic, analysis software, and other utilities that are used to configure the hardware and to move the data from data acquisition memory to a laptop or other computer. The collected racing data is sent to a single telemetry server, which then feeds it into a computer application. The application file shares the data with relevant customized sub-applications, which can operate on separate laptops manned by individual crew members.

Data logging systems generally consist of five elements: (1) sensors to sense and measure the parameters of interest, (2) real time signal processing for the desired sensor signals; (3) memory unit for recording and storing output signals, (4) up-loading/accessing recorded data including telemetry data, and (5) analysis of recorded data. Sensors must meet certain specifications, such as how the sensors' cables are routed to protect them from electromagnetic interference from other electronic systems. The data acquisition system unit (including memory) and the link from the data acquisition system unit to the operating platform (to upload the acquired data via a hardwire cable or telemetry) also must conform to requirements.

Telemetry provides for the remote measurement and reporting of the information of interest and can refer to wireless communications (i.e., using radio waves as a data link), but can also refer to data transfer over other media, such as a telephone, cable, computer networks, or via an optical link. Some race car data acquisition systems use telemetry to send data collected from the race car to the engineers in the pits every time the vehicle acquires more than 50 Mb of data. Telemetry is also used to transfer information when the vehicle is in the pit lane. With the most advanced telemetry, the data may be sent continuously for analysis through a radio transmitter as long as a good connection is present, usually through a hovering helicopter, which is not always possible in parts of certain raceways due to obstruction from an overpass. Data collected using telemetry in a practice run provides information required to fine tune the mechanical and/or electrical system of the race car, such as correcting gear ratios for a particular track layout, setting the engine acceleration speed according to throttle position, setting proper tire pressure and shift points. The engine control system also will be programmed with suitable configuration parameters for better performance. Telemetry, however, cannot be used in all instances. The performance of drag cars, used in drag racing, for example, cannot be monitored using telemetric means, and thus, requires other real-time data acquisition means.

Parameters measured and recorded by a data acquisition system may be broken into four generic categories, due to system requirements and the complexity of major components. For example, a wheel speed sensor not only monitors the wheel speed but also may measure the speed of the vehicle. The four categories are:

(1) engine: RPM, fuel and oil pressure, water and oil temperature, turbo charger boost pressure, exhaust gas temperature, battery voltage, inlet air temperature and throttle position sensor, fuel flow rate and airflow rates.

(2) chassis: wheel speed, steering angle, lateral and longitudinal G-force (applied from braking and cornering), brake line pressure, damper movement and gear position. Advanced data acquisition systems also measure and record ride height, drive shaft torque, suspension loads, tire pressure and compound temperature, and brake disk temperature. They also offer optional measurement of aerodynamic parameters, including air speed and local air pressures.

(3) driver: both engine and chassis-related properties controlled by the driver, such as throttle position, gear position, steering angle and brake line pressure.

(4) drive train: drive shaft speed, transmission pressure and temperature, suspension position, gear and clutch position and speed.

Analysis software, another part of the data acquisition system, is used to present the collected data in various graphical and tabular forms. Advanced analysis software displays graphs of the vehicle's performance in real time allowing the system to record parameters for analyses that cover the whole set-up of the race vehicle (up to 100 channels).

Output from a data acquisition system is monitored by engineers in the pit and garage area for any sign of mechanical failure, thus, providing the designers and material analysts with insight into the cause of any precipitant fault, providing a significant safety factor for drivers and perhaps a reduction in insurance rates. Race strategists and engineers depend on real time data acquisition system collected data for making more informed decisions regarding driver technique. Total data from a motor sport event may exceed 80 gigs of storage space. Note, however, real time telemetry is not permitted in drag races at this time.

A good example of the usefulness of critical data acquisition systems in motor sports is the 2003 British Grand Prix, where engineers in the pits observed the loss of pressure from one of Coulthard's tires. Analysis of data acquisition system collected data allowed the team to recall Coulthhard from a practice run, resolving the fault before a dangerous situation occurred, likely saving property and life.

SUMMARY

The invention described herein presents the means and the method to collect, store, display, and analyze data pertaining to the parameters of race car, other combustion engines, and various industrial applications performance. The Data Acquisition System invention comprises a portable palm-sized, data acquisition server (DAS 20) having an integrated web-server and software dedicated for programming the system to collect, record, store, transmit, and analyze performance data collected from, for example, race cars. To measure, record, and transmit data of interest, the Data Acquisition System includes apparatus to measure, for instance, exhaust temperatures, an example of such an apparatus is a device to measure real-time drag car exhaust temperature, herein referred to a dedicated "header banks", because for the use illustrated such header banks would generally be dedicated to a specific engine. To measure other parameters of interest, the Data Acquisition System also includes a large number of sensor and signal inputs provided by an engine (or as in the illustrated example, a vehicle) dedicated sensor wiring harness. The sensor and signal data collected through the header bank and wiring harness are processed and stored by the DAS for transmission to a computer network via Ethernet connection, or other display or output device. The DAS is portable, that is, it can be shared between a number of users and engines, is easy to learn to use, simple and low cost to manufacture, and affordable for most. A major feature of the Data Acquisition System, as disclosed, is the use of fiber optic cables for the transmission of data between the header banks (or the apparatus to measureexhaust temperatures) and the DAS, which provides excellent protection against signal distortion and provides for an extended distance of the fiber optic communication cable to be between the header banks and the DAS so that the DAS can be installed in most any convenient area of the engine housing. Another major feature of the claimed invention are the I/O signaling wires that can be programmed by the system to be used as digital input or output signals, analog input signals, and regulated current source signals. The claimed invention also offers an optional external weather station module for atmospheric temperature, pressure, and humidity measurements.

The device according to the principles of the claimed invention comprises a Data Acquisition System, comprising:

components communicatively connected forming a data acquisition system comprising:

at least one apparatus for obtaining exhaust parameters of an engine, at least one wiring harness for obtaining real-time performance parameters of the race car, at least one data acquisition server (DAS) detachably attachable to a selected mounting location, the DAS electronically coupled and detachably attachable to the at least one apparatus for obtaining exhaust parameters and to the at least one wiring harness, the wiring harness capable of identifying the car to the DAS, fiber optic cable communicatively connecting the DAS and the at least one means for collecting engine exhaust parameters.

Where the components are each further configured to be a receiver and a transmitter and the DAS is sized to fit into the palm of a hand.

Moreover, where the wiring harness has a plurality of wires each having one end electrically connected to a signal source for obtaining the performance data and the other end electrically connected to the harness and where each of the wires electrical connections are identified by a first identifying code, a second identifying code, and a third identifying code.

Furthermore, where a select number of signals identify the engine to which the wiring harness is connected via the DAS.

Another feature comprises a select number of the wires to provide an LED light signal that assists in diagnostics.

Yet still another feature, is a select number of channels to which the sensors are connected are programmable through a web-server as digital input or output signals, analog input signals, or as regulated current source outputs.

Another advantage is where the communicatively connecting fiber optic cable may be up to 30 feet in length.

Yet another advantage is that the DAS is sized to fit into the palm of a hand making the DAS easily portable.

A distinct, but connected, advantage is that the components require a communicatively connected SPI BUS having a master device and multiple SPI slave devices, where the SPI Bus requires only a three-signal connection that supports the one master device and several connected slave devices, and where the SPI Bus has bus signals chip select and clock out. The chip select and clock out signals are combined through a logical "AND" function providing for an SPI bus clock signal gated to be active only when the SPI bus master's chip select and clock signals are active and the gated SPI clock signal is connected to a single SPI bus slave device, and the connected SPI bus slave device receives a clock signal selecting it as the only active SPI slave device. The connected SPI bus signal master-in requires a tri-state buffer with a logic control signal to be placed between each SPI bus master and slave device, the tri-state buffer output signal is connected to the SPI bus master-in signal, and the tri-state logic control signal is activated by the corresponding SPI bus chip select signal forming a multiplexer allowing only the selected SPI bus master-in signal to be routed to the SPI bus master device.

Additionally, an SPI interface adapter for an SPI bus master and an SPI bus slave, are made up of communication pathways between the SPI and each of the three signals master-Out, clock-Signal, and master-In of the apparatus for obtaining performance parameter data, where there are only 3 signal connections between the SPI bus master and SPI bus slave in an SPI bus with multi-slave devices.

And finally, there is a method of making a data acquisition system, comprising providing components communicatively connected forming a data acquisition system comprising:

at least one apparatus for obtaining exhaust parameters of an engine and one additional input voltage parameter, at least one wiring harness for obtaining real-time performance parameters of the engine, at least one data acquisition server (DAS) detachably attachable to an engine housing, coupling and detachably attaching the DAS electronically to the at least one apparatus for obtaining exhaust parameters using fiber optic cable to communicatively connecting the DAS and the at least one means for collecting engine exhaust parameters, and coupling and detachably attaching the DAS to the at least one wiring harness, the wiring harness capable of identifying the engine to the DAS.

The claimed invention resides not in any one of these features per se, but rather in the particular structure and particular dimensions, and the combinations of these features herein disclosed which distinguishes the claimed invention from currently available Data Acquisition Systems, especially from ones used in race car applications.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the claimed invention. It is important, therefore, that the claims be regarded as including such equivalent constructions insofar as they do not depart from the spirit and scope of the claimed invention.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the claimed invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the claimed invention and are not therefore to be considered limiting in scope, thus, the invention will be described and explained with additional specificity and detail through the use of the accompanying drawings, in which:

FIG. 2 is a plan view of the wiring harness of the claimed invention.

LIST OF REFERENCE CHARACTERS AND PARTS TO WHICH THEY RELATE

19 A Data Acquisition System

Figure 1:
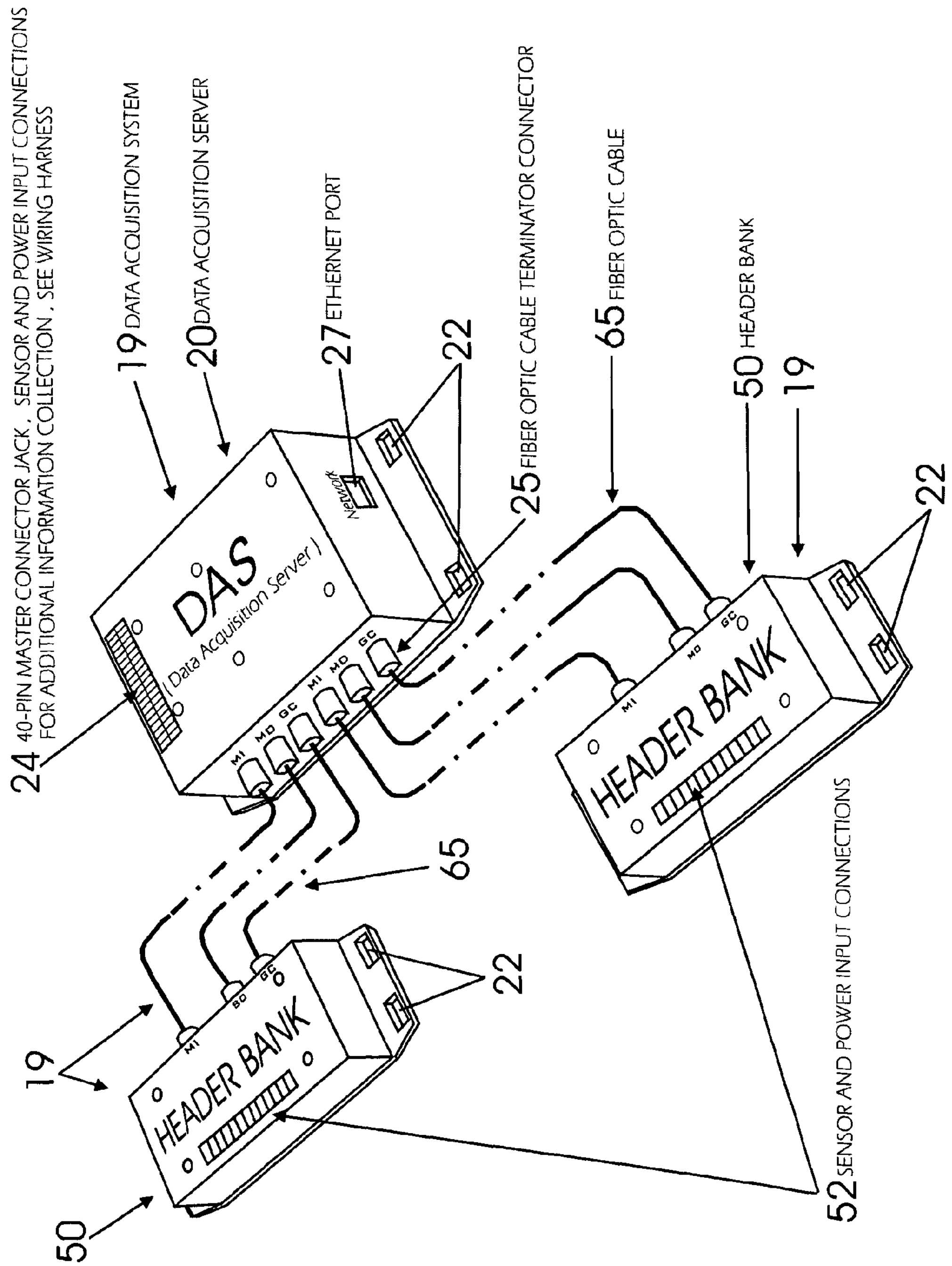
FIG. 1 is a perspective view illustrating a data acquisition server (DAS 20) and two header banks of the claimed invention.

20 Data acquisition server (DAS 20) that performs signal processing, interfacing, storage and networking.

22 Mounting hole used with a quick release fastener for easy and fast plugging and unplugging making DAS 20 easily portable.

24 40-Pin male socket connector providing for connecting to wiring harness for easy and fast plugging and unplugging.

25 Fiber optic cable termination connector providing for easy and fast plug/unplug capability.

27 Ethernet port socket providing for a standard computer network connection cable use.

50 Header bank 50, in this illustration, converts and sends five sensor signals to DAS 20 via fiber optic cable.

52 Provides for connecting up to five sensors, a power and ground input and a sensor supply voltage.

60 Power and ground input required to power header bank 50.

62 K-type thermocouple sensor lead wires for measuring exhaust gas temperature.

65 Fiber optic cable provides for immunity to electrical interference.

67 Sensor signal lead wires providing for connecting various sensor types to header bank 50.

69 Protective Sleeve: provides protection to wires and fiber cables.

70 Wiring Harness Colored Wires: identifies electrical connections made through its connectors.

71 Spiral-wrap provides protection to wires and allows efficient wire routing management.

72 Green colored heat shrink tubing groups wires together and identifies them for ease of use.

73 Red colored heat shrink tubing groups wires together and identifies them for ease of use.

74 Blue colored heat shrink tubing groups wires together and identifies them for ease of use.

75 Yellow colored heat shrink tubing groups wires together and identifies them for ease of use.

76 White colored heat shrink tubing groups wires together and identifies them for ease of use.

77 Crimp wire connector providing for fast, easy and reliable connections between wires.

78 Car identity I/O lines provide for separate data to be maintained each for a different race car.

79 LED light providing various types of status information to the user.

100 Wiring harness providing input and output signals, power and ground connections to DAS 20.

110 Sensor, signal, and power wires that are connected to the wiring harness.

126 A 40-Pin female plug connector providing for plugging/unplugging wiring harness 100 into and out of, respectively.

130 Ethernet cable connecting DAS 20 to computer network for setup, data display, and graphing.

132 Quick release screw fasteners for fast DAS 20 removal.

140 Power and ground input: required to power the DAS 20.

DEFINITIONS

Accelerometer, as used herein, refers to a device for measuring the total specific external force on a sensor. An accelerometer inherently measures its own motion, in contrast to a device based on remote sensing. Accelerometers can be used to measure vibration on cars, machines, buildings, process control systems and safety installations. They can also be used to measure seismic activity, inclination, machine vibration, dynamic distance, and speed with or without the influence of gravity. Linear accelerometers measure how the vehicle is moving in space. Since a vehicle primarily moves in two axis (left & right, forward & back), there can be linear accelerometer for each axis. Lateral accelerometer measures the centrifugal force created during a turn. The data it provides is weighed against all of the other inputs and is used to calculate whether or not the performance limits of the vehicle are being exceeded under the current speed and traction conditions.

ADC, as used herein, refers to an analog-to-digital converter (abbreviated ADC, A/D or A to D) An ADC is an electronic integrated circuit, which converts continuous signals to discrete digital numbers. The reverse operation is performed by a digital-to-analog converter (DAC). Typically, an ADC is an electronic device that converts an input analog voltage (or current) to a digital number. The digital output may be using different coding schemes, such as binary, Gray code or two's complement binary.

Analog signal, as used herein, refers to a time continuous signal where some time varying feature of the signal is a representation of some other time varying quantity. It differs from a digital signal in that small fluctuations in the signal are meaningful. Analog is usually thought of in an electrical context, however mechanical, pneumatic, hydraulic, and other systems may also convey analog signals. An analog signal uses some property of the medium to convey the signal's information. Electrically, the property most commonly used is voltage followed closely by frequency, current, and charge. Any information may be conveyed by an analog signal, often such a signal is a measured response to changes in physical phenomena, such as temperature, position, or pressure, and is achieved using a transducer. Since an analog signal has a theoretically infinite resolution, it will always have a higher resolution than any digital system where the resolution is in discrete steps. In practice, as analog systems become more complex, effects such as nonlinearity and noise ultimately degrade analog resolution such that digital systems surpass it.

Computer hardware, as used herein, is the physical part of a computer, including the digital circuitry, as distinguished from the computer software that executes within the hardware. The hardware of a computer is infrequently changed, in comparison with software and data, which are "soft" in the sense that they are readily created, modified or erased on the computer. Most computer hardware is not seen by normal users. It is in embedded systems in a desired device, such as the Data Acquisition System described herein.

Computer software, as used herein, is a general term used to describe a collection of computer programs, procedures and documentation that perform some task on a computer system. The term includes application software such as word processors which perform productive tasks for users, system software such as operating systems, which interface with hardware to provide the necessary services for application software, and middleware which controls and co-ordinates distributed systems. Practical computer systems divide software systems into three major classes: system software, programming software and application software, although the distinction is arbitrary, and often blurred. System software helps run the computer hardware and computer system. It may include operating systems, device drivers, diagnostic tools, servers, windowing systems, utilities and more. The purpose of systems software is to insulate the applications program as much as possible from the details of the particular computer complex being used, especially memory and other hardware features, and such as accessory devices as communications, printers, readers, displays, keyboards, etc. Programming software usually provides tools to assist a programmer in writing computer programs and software using different programming languages in a more convenient way. The tools include text editors, compilers, assemblers, interpreters, linkers, debuggers, and so on. An Integrated development environment (IDE) merges those tools into a software bundle, and a programmer may not need to type multiple commands for compiling, interpreter, debugging, tracing, etc., because the IDE usually has an advanced graphical user interface, or GUI. Application software allows end users to accomplish one or more specific (non-computer related) tasks. Typical applications include industrial automation, business software, educational software, medical software, databases, and computer games. Businesses are probably the biggest users of application software, but almost every field of human activity now uses some form of application software.

Data Acquisition Server (DAS), as used herein, is an application or device performing services for clients as part of a client-server architecture. RFC 2616 (HTTP/1.1) defines a server application as "an application program that accepts connections in order to service requests by sending back responses." Server computers are devices designed to run such an application or applications, often for extended periods of time with minimal human direction. Examples of servers include web-servers, e-mail servers, and file servers.

Furthermore, the DAS, of the claimed invention, using the example of data acquisition of race car performance data, sends commands to the connected header bank 50 (HB) devices then processes and stores the received data sent from the HB as a file server does. DAS is considered to be the master component of this Data Acquisition System and the server. For example, data from a number of connected signal sources such as sensors is transmitted through the integrated web-server to a networked PC running a web-browser application where it is displayed (served) as in Data Acquisition Server. The DAS also maintains a database of various sensors types and, the different (individual) race cars that the various sensors are installed in and the sensor data acquired during the performance of these various cars. The DAS can transmit the data stored in this database, or requested parts of it, through its Ethernet port to a network or PC, similar to a network file server.

Data Acquisition Systems, as used herein, are used to automatically collect information. The term has a number of meanings. A Data Acquisition System can access different databases in order to move relevant data into a more specific database. The term is used, in this case, to describe hardware and software that gathers data from the real world, through various sensors, signal sources, instruments, and other measuring devices, such as the invention described herein.

Differential signaling, as used herein, refers to a method of transmitting information electrically by means of two complementary signals sent on two separate wires. The technique can be used for both analog signaling and digital signaling, as in RS-422, RS-485, PCI Express, and USB. The opposite technique, which is more common but lacks some of the benefits of differential signaling, is called single-ended signaling.

Digital filter, as used herein, refers to any electronic filter that works by performing digital mathematical operations on an intermediate form of a signal. This is in contrast to older analog filters which work entirely in the analog realm and must rely on physical networks of electronic components (such as resistors, capacitors, transistors, etc.) to achieve the desired filtering effect.

Digital signal, as used herein, refers to a discrete-time signal that takes on only a discrete set of values. It typically derives from a discrete signal that has been quantized. Common practical digital signals are represented as 8-bit (256 levels), 16-bit (65,536 levels), 32-bit (4.3 billion levels), and so on, though any number of quantization levels is possible, not just powers of two. A discrete signal or discrete-time signal is a time series, perhaps a signal that has been sampled from a continuous-time signal. Unlike a continuous-time signal, a discrete-time signal is not a function of a continuous-time argument, but is a sequence of quantities; that is, a function over a domain of discrete integers. Each value in the sequence is called a sample. When a discrete-time signal is a sequence corresponding to uniformly spaced times, it has an associated sampling rate; the sampling rate is not apparent in the data sequence, so may be associated as a separate data item.

File, as used herein, refers to a block of information stored either in volatile static RAM (SRAM) or in flash memory. Examples in this document include the settings files and the data files.

Flash memory, as used herein, is non-volatile computer memory that can be electrically erased and reprogrammed. It is a technology primarily used in memory cards, and USB flash drives (thumb drives, handy drive, memory stick, flash stick, jump drive) for general storage and transfer of data between computers and other digital products. It is a specific type of electrically erasable programmable read-only memory (EEPROM) that is erased and programmed in large blocks. In early flash the entire chip had to be erased at once. Flash memory costs far less than byte-programmable EEPROM and therefore has become the dominant technology wherever a significant amount of non-volatile, solid-state storage is needed. Examples of applications include personal digital assistants (PDAS 20) and laptop computers, digital audio players, digital cameras and mobile phones. It has also gained some popularity in the game console market, where it is often used instead of EEPROMs or battery-powered static random access memory (SRAM) ("Save RAM", which was not necessarily static RAM) for game save data. Flash memory is non-volatile, which means that it does not need power to maintain the information stored in the chip. In addition, flash memory offers fast read access times (although not as fast as volatile dynamic random access memory (DRAM) memory used for main memory in personal computers (PCs)) and better kinetic shock resistance than hard disks. These characteristics explain the popularity of flash memory for applications such as storage on battery-powered devices. Another feature of flash memory is that when packaged in a "memory card", it is enormously durable, being able to withstand intense pressure, extremes of temperature and immersion in water. Although technically a type of EEPROM, the term "EEPROM" is generally used to refer specifically to non-flash EEPROM which is erasable in small blocks, typically bytes. Because an erase cycle is slow, the large size of a flash ROM's erase block can make programming it faster than old-style EEPROM.

Handshaking, as used herein, refers to the automated process of negotiation that dynamically sets parameters of a communications channel, established between two entities, before normal communication over the channel begins. It follows the physical establishment of the channel and precedes normal information transfer. Handshaking may be used to negotiate parameters that are acceptable to equipment and systems at both ends of the communication channel, including, but not limited to, information transfer rate, coding alphabet, parity, interrupt procedure, and other protocol or hardware features. Handshaking makes it possible to connect relatively heterogeneous systems or equipment over a communication channel without the need for human intervention to set parameters. One classic example of handshaking is that of modems, which typically negotiate communication parameters for a brief period when a connection is first established, and thereafter use those parameters to provide optimal information transfer over the channel as a function of its quality and capacity.

Header banks, as used herein, refers to a device, or apparatus, for the collection of various types of data, including exhaust temperature data. In the example illustrated, the header banks collect temperature and pressure data to send to a DAS, which in turn communicates the data to a connected computer or display. The header banks, as illustrated, are deemed to be vehicle specific, but, if desired may be shared by a number of vehicles.

Master, as used herein, refers to a device that initiates SPI communications with a slave. The master sends commands to the slave over an SPI bus to perform a certain function. In the claimed invention the SPI bus master is located within the DAS.

Maximum aggregate sampling rate, as used herein, refers to a fixed sampling rate, for example, 16,000 per second, for one input signal or to be shared among a plurality of input signals.

Multiplexer, as used herein, refers to a device that performs multiplexing. That is, it selects one of many analog or digital input signals and outputs the selected signal into a single line. An electronic multiplexer makes it possible for several signals to share one expensive device or other resource, for example one A/D converter or one communication line, instead of having one device per input signal.

Sampling, as used herein, refers to the reduction of a continuous signal to a discrete signal. A common example is the conversion of a sound wave (a continuous-time signal) to a sequence of samples (a discrete-time signal). A sample refers to a value or set of values at a point in time and/or space. A sampler is a subsystem or operator that extracts samples from continuous signal. A theoretical ideal sampler multiplies a continuous signal with a Dirac comb. This multiplication "picks out" values but the result is still continuous-valued. If this signal is then discretized (i.e., converted into a sequence) and quantized along all dimensions it becomes a discrete signal.

Sampling rate, sample rate, or sampling frequency, as used herein, defines the number of samples per second (or per other unit) taken from a continuous signal to make a discrete signal. For time-domain signals, it can be measured in Hertz (Hz) or in samples per second. The inverse of the sampling frequency is the sampling period or sampling interval, which is the time between samples. The concept of sampling frequency can only be applied to samplers in which samples are taken periodically.

Sensor, as used herein, is a device that measures a physical quantity and converts it into a signal which can be read by an observer or by an instrument, such as a DAS or header bank. Most sensors used in this invention provide an analog voltage output signal. Some sensors however provide a digital signal output such as a driveshaft speed sensor.

Signal, as used herein, is a codified message, that is, the sequence of states in a communication channel. This can be represented by an analog or digital signal on a wire represented as a voltage level. It could also be represented as a light pulse in the case of a fiber optic application. Sometimes a signal is an output from a device such as in an engine ignition system. It can provide a tachometer output signal to be used by another system such as a DAS. A simple switch could also provide a useful signal.

SPI (Serial Peripheral Interface) Bus, as used in presently available systems, generally refers to a 4-wire serial bus that supports one master device connected to several slave devices. The first signal is the "Clock Signal" (CK or SCLK) that originates from the master and must go to each of the SPI slave devices in order to achieve an information transfer. This controls the SPI bus information flow rate. The second signal is "Slave In" (SI) that also originates in the master and must connect to each of the SPI devices; commands are sent over this line. The third signal is the "Slave Out" (SO) that originates in the SPI slave device. Status and sensor data is sent to the master over this line. The fourth signal is the "Chip Select" (CS) line that ordinarily is sent from the master to a slave SPI device in order to select it in a system having multiple SPI devices sharing a single SPI bus such as the DAS. In other art connection scenarios, the master is connected to several CS lines, one going to each slave.

The SPI implementation scheme in the device of the claimed invention, however, performs device selection without requiring a separate CS line to be run between the SPI master and SPI slave as in the case of the DAS and the Header bank, thus requiring only 3 signal connections between an SPI master that communicates with multiple SPI slave devices instead of 4 signals. This reduces the amount of hardware needed for SPI communication and increases reliability.

Single-ended signaling, as used herein, refers to the simplest method of transmitting electrical signals over wires, where one wire carries a varying voltage that represents the signal, while the other wire is connected to a reference voltage, usually ground. SE is the SCSI standard, and viable cable lengths range from 1.5 meters to 3 meters. The main advantage of single-ended over differential signaling is that fewer wires are needed to transmit multiple signals. If there are n signals, then there are n+1 wires–one for each signal, plus one for ground, whereas differential signaling uses at least 2n wires. The main disadvantage of single-ended signaling is that the return currents for all the signals share the same wire, and can sometimes cause interference ("crosstalk") between the signals. This limits the bandwidth of single-ended signaling systems.

Slave, as used herein, refers to a device that receives information or commands from the Master over an SPI bus. The slave then executes that command, typically resulting in data being sent to the master. In the claimed invention the header banks contain SPI bus slave devices.

Telemetry, as used herein, is a technology that allows the remote measurement and reporting of information of interest to the remote system designer or operator. The word is derived from Greek roots tele=remote, and metron=measure. Systems that need instructions and data sent to them in order to operate require the counterpart of telemetry, tele-command. Telemetry typically refers to wireless communications (i.e. using a radio system to implement the data link), but can also refer to data transfer over other media, such as a telephone or computer network or via an optical link.

The DAS of the present system is designed to work with systems that cannot use telemetry, such as for the vehicles used in Drag Racing. Drag Racing events last only for a few seconds, which is too short a time to use telemetry to send data to a crew. The claimed invention, if desired, provides for telemetry capability through its Ethernet port, radio transmitter and receiver and supporting software. GPS positioning, in this case, would be used with the system to determine a theoretical time for a lap, allowing a driver to try to achieve this theoretical best time. Radio transmission of data to a crew location receiver can support NASCAR, Indy, Formula and other forms of road racing as permitted.

Thermocouple, as used herein, consists of two wires, of different materials, welded or fused together. For example, in monitoring race car exhaust systems, a type K thermocouple with a maximum temperature of 2100 degrees Fahrenheit would be most suitable. In a type K device one wire is an alloy called CHROMEL®, and the other an alloy called ALUMEL®. An end portion of each wire are welded or fused together and encased in an electrically insulated sheath while the other ends of the wires are connected to a very sensitive voltmeter. When the fused end of the thermocouple wire is heated, it generates a millivolt current that is an accurate indicator of the temperature of the end of the thermocouple. These thermocouples are remarkably sturdy and reliable because they have no delicate parts to break; the main requirement is not to exceed their maximum temperature.

Web-server, as used herein, is a term that can refer to either: (1) a computer program that is responsible for accepting HTTP (hypertext transfer protocol—which is a communications protocol used to transfer or convey information on intranets and the World Wide Web) requests from clients, such as web-servers, spiders, or other end-user tools, and serving them HTTP responses along with optional data contents, which usually are web pages such as HTML documents and linked objects (images, etc.), or as (2) a computer that runs a computer program as described above.

It should be understood that the drawings are not necessarily to scale. In certain instances, details which are not necessary for an understanding of the claimed invention or which render other details difficult to perceive may have been omitted.

DETAILED DESCRIPTION

The invention, as disclosed herein, is a Data Acquisition System providing both means and methods to measure, record, transmit, store, download, and analyze data that is created by performing engines, such as race car engines, combustion engines, and in various industrial applications in real and in other time. The System incorporates embodiments in various sizes, shapes, and forms. The Data Acquisition System used herein for illustration purposes is intended for use in racing vehicles, particularly for drag race vehicles. Therefore, the embodiments and examples described herein are provided with the understanding that the present disclosure is intended as illustrative and are not intended to limit the invention to the embodiments described.

The Data Acquisition System, as taught herein works with systems that are unable to use telemetry, such as measuring performance parameters of drag race vehicles, although, if desired, the present system can support telemetry capabilities. The Data Acquisition System includes both hardware and software. The hardware incorporates palm-sized, portable, electronic devices, such as a packaged data acquisition server (DAS), which is designed to be shared among several vehicles, and which incorporates a serial peripheral interface (SPI), an integrated web-server, and integrated applications dedicated to programming the system for real-time processing, for example, to collect, record, store, transmit, and analyze race car performance data; a plurality of vehicle apparatus (herein referred to as header banks) for collecting and transmitting exhaust system data sets and an additional analog sensor data set to the DAS. The hardware further includes a wiring harness that is usually vehicle dedicated, but does not have to be. Data, besides that collected from the exhaust system and other analog system data transmitted by the header banks, is collected by sensors or through other signals that are electronically connected to the DAS via the wiring harness. The DAS is easily disconnected and moved from one race vehicle to be reconnected in another, thus providing for economical cost sharing among drivers. DAS's easy portability is made possible by its small (i.e., palm-sized) size, which is two to three times smaller than presently available analogous devices. The header banks of the claimed invention are also two to three times smaller than presently available analogous devices. Furthermore, DAS contains software that provides for it to repeatedly recognize and transmit the properties of a given race car once the DAS has been connected to a car's given (installed) wiring harness. Another important innovation of the claimed invention is the use of optical cables as signal connectors between the header banks and the DAS. This use of the fiber optic cables provides for increased noise immunity, signal length increased by up to fifty times over that of presently available systems, and having visible light emitting from the header banks and also provides for easy and rapid cable termination (i.e., signals can be severed using only a sharp blade). Yet still another advantageous property of the present system is that a number of signal wire supports four different types of signals such as an analog or digital input, or digital output or a regulated current source output. The ability to support four different signal types on a single wire adds a great deal of versatility to the DAS. Furthermore, these signal types are rapidly and easily selected using a communicatively connected PC and web browser, such as Microsoft Internet Explorer. Moreover, the Data Acquisition System is easy to learn to use, simple and low cost to manufacture, and affordable.

In drag racing, "tire spin" is a phenomenon that occurs as a race car rapidly accelerates during a race. As engine power to the driving tires increases, the car is propelled down the track. If the engine power increases too rapidly, static friction between the tire and the surface of the race track is lost, resulting in the tire spinning faster than the car is moving in relation to the track. Too little tire spin, however, will result in a slow time for the race. Too much tire spin can also result in a slow time for the race because as the static friction decreases, the sliding friction increases. A certain amount of sliding friction between the tire and track surface is desirable. However, if the sliding friction is increased beyond a condition dependent threshold the race car acceleration rate will decrease. The sliding friction is then less capable of providing thrust to propel or accelerate the car rapidly. Thus, having the ability to quantify the amount of tire spin can be crucial in a drag race.

Knowing the amount of static and sliding friction, changes can be made to the engine, drive train, and tires to optimize the performance time. The DAS uses accelerometer sensor data and tire speed data to mathematically determine the amount of static and sliding friction, i.e. tire spin, 100 times per second. As the car accelerates, the tire diameter increases due to the increasing centrifugal force. This can cause an error in the tire spin computation since the tire speed is initially derived from the drive shaft speed and the rear axle gear ratio and tire diameter used. The DAS is programmed to compensate for the increasing tire diameter using an adjustment table that specifies the changing tire diameter as a function of tire speed. The DAS then generates the data needed for a graph or tabular display of tire spin data. This data is used to best tune the car for the next race. Referring now to the drawings, the invention will be described with more particularity.

Figure 3:
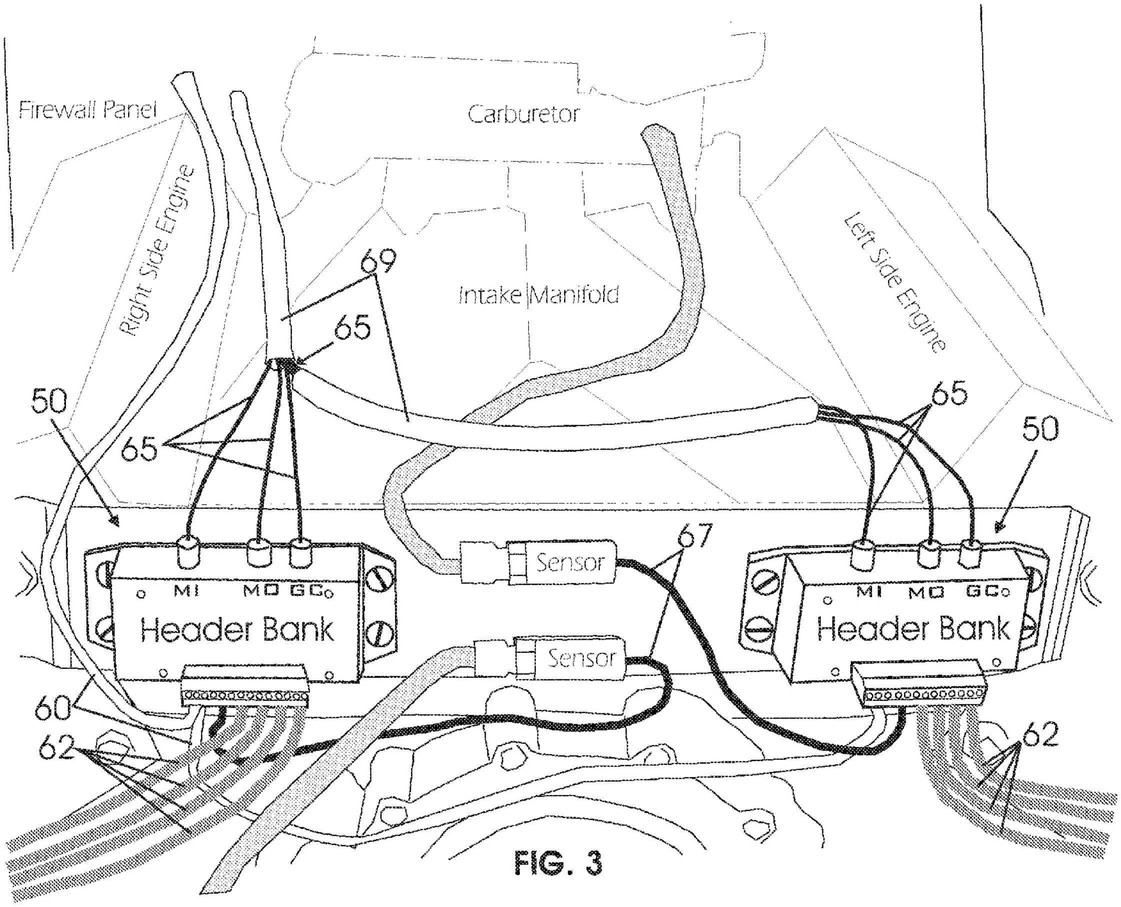
FIG. 3 is a perspective view of two header banks, as illustrated in FIG. 1, mounted inside a vehicle engine compartment.

Data acquisition server (DAS) 20 and header banks 50 (also referred to as vehicle apparatus for collecting and transmitting exhaust system data) of the Data Acquisition System 19, as disclosed herein, are illustrated in the perspective view of FIG. 1. In this figure, header banks 50, measure properties of the race car exhaust system and one additional property, a voltage signal, such as that created by a manifold input pressure or fuel pressure sensor, and then transmit the exhaust system and pressure sensors data through the header banks 50 to DAS 20, which, in turn, sends related instruction back to the header banks, such as channel sequencing. Header banks 50 directly measure exhaust gas temperatures using exhaust gas thermocouples installed in an exhaust manifold. The header banks require the use of K-Type thermocouple sensors. As each header bank 50 has four separate balanced thermocouple input channels, exhaust gas temperature can be measured for up to an eight cylinder engine. This is done by using two header banks connected to the DAS. Two header banks are used frequently, as eight cylinder engines are most often used in auto racing, especially in drag racing. If a race car has a four cylinder engine, then only one header bank is required. If an engine has six cylinders, then two header banks can be used by connecting four thermocouple sensors to the first header bank and two thermocouples to the second header bank. In the design of header bank 50, balanced signal input to the analog to digital converter allows for a high common noise rejection capability. This means, most of the noise voltages that occur in thermocouple sensor wires become automatically canceled out. The remaining noise voltage passes through a digital filter also within the header bank. This further removes the unwanted electrical noise signal allowing for a higher degree of accuracy. Header banks 50 accuracy performance is further increased by using sixteen bits resolution in the analog to digital conversion process. This allows small temperature changes to be measured, down to a tenth of a degree. In order to maintain the ideal fuel to air ratio that produces a desired combustion temperature, it is important to know the temperature of the exhaust gas. If the exhaust gas becomes too hot the metallic engine parts can be affected, as the crystal structure of the metal changes at around 1200 degrees. The header banks also provide an additional dedicated voltage input channel. This input has been designed to allow various sensor types that have a voltage output from one half of a volt to four and a half volts. This is a common voltage range used by many different sensor types and manufacturers. For example one header bank 50 might have a supercharger boost pressure sensor connected to it while a second header bank 50 has a fuel pressure sensor connected to it. As all header banks are structurally identical, the sensors can be connected to either header bank 50. The web-server setup program is used to configure DAS 20 internal database for the particular sensor type used and to which header bank 50 is connected. The sensor and signal data that are processed and measured, and transmitted by header banks 50 is collected by DAS 20 that is provided with the software required for real-time signal acquisition, processing, and storage of race car performance data, as well as, for the storage and transmission of this data to a stand alone program or computer network programmed for analyzing the collected data. Additional signals, relating to the real time performance of the race car, are input to wiring harness 100 (see FIG. 2). The input of wiring harness 100 is connected to DAS 20 through the sockets of master connector jack 24. Master connector jack 24, in this example, is a 40-pin male socket connector that provides for fast plug/unplug connection to wiring harness plug 126. Each header bank 50 is additionally provided with a sensor power-supply-voltage output and power input through connector 52 (see FIG. 1). Five sensors (four thermo-couple sensors and a multi-use input supporting various sensors), a power and ground input, and sensor-supply voltage connections are shown in FIG. 3. Note that sensor wires 67 comprise three connection wires; a ground, a sensor supply voltage supplied to the sensor, and a sensor output voltage signal wire connected to header bank 50 input. Even though they provide all of the improved measurement collection and transmission abilities, as described above, and each header bank 50 is sized to fit into the palm of a hand. As mentioned above, the footprint of the DAS 20 is about two to three times smaller than those in presently available data collection devices and, thus, is light and small enough to be easily transported between race cars along with the header banks. Sharing DAS 20 between a plurality of cars provides significant savings for race cars owners as they do not have to purchase a complete Data Acquisition System for each of their cars. DAS 20 may be attached to the interior of the cab proximate to the race car's dashboard or glove box by detachable attachment means, such as screws or a clamp that would be placed, for example, in attachment openings 22, as illustrated in FIG. 1. DAS 20 contains a built-in web-server providing for up-loading and down-loading of collected data using a high-speed Ethernet hardware interface plugged in Ethernet port 27 rather than using the older RS-232 system for transporting the data to a PC or other system. This provides for Data Acquisition System hardware to be smaller, less costly, and ten times faster than devices using RS-232.

One example of the variety of possible structures for wiring harness 100 of the disclosed invention is provided in FIG. 2. Again, using drag car race vehicles as an example, each vehicle is fitted with its own fixed wiring harness 100 that is programmed to identify the vehicle into which it is installed and to communicate the identification information to the DAS. The two vehicle identity I/O lines 78 are signal inputs that may either be connected to battery ground or left unconnected. This allows for four possible signal conditions to exist, each representing a unique condition found only in a specific race car. DAS 20 is programmed to recognize the identity information into from specific wiring harnesses and, thus, to recognize the vehicle to which the wiring harness is attached. The capability of identifying four different race cars allows DAS 20 to maintain a separate database and profile for each car, including data, such as; car name, connected sensor and signal types representing the various types of parameters being processed by DAS 20. The DAS database also maintains a record of each data recording session for each car separately. This allows all recorded data for a specific car to remain in the flash memory until it is no longer needed and can then be erased from DAS 20 by use of the web-server. DAS 20 has enough storage flash memory for 40 drag races or more. If DAS 20 does not need to be shared and is permanently installed in a race car then signals 78 can be used for connecting other signals to DAS 20 such as sensors and switches. This is one example of the versatility of the design in which a single wire is used for several different application scenarios in a race car. The particular function of signals 78 is specified to DAS 20 by using the web-server setup program. LED 79 provides a light to signal various types of status information to the user and uses two wires on wiring harness 100. By using the web-server the particular function of the LED can be changed to different modes of operation. When DAS 20 is first powered-on, the LED is put into normal mode: DAS 20 flashes the LED on for 1 second then does a self-diagnostic check. This takes less than 1 second. If DAS 20 passes the check, it again flashes the LED signaling the user that it is functioning properly. When DAS 20 starts reading the various connected sensors and input signals, and processing and recording the information into the flash memory, the LED remains illuminated. This signals the user that the data acquisition system is in record mode. When certain sensors are being installed in a race car such as a driveshaft tachometer sensor it is useful to put the LED in the driveshaft tachometer mode. This allows the sensor to be properly adjusted during the install process by illuminating the LED whenever the driveshaft sensor senses the driveshaft and its turning. The forty wires of the wiring harness are collected into the 40-pin female plug connector 126 for easy and rapid plugging and unplugging to and from DAS 20. Wiring harness 100 offers up to 27 input channels to connect sensors, switches and other signal sources; analog and digital for measuring and/or recording the data of a desired race car's performance properties. Wiring harness 100 connects the signal inputs that represent the parameters of interest, to the wires of the wiring harness using crimp wire connectors 77, which provide for fast, easy, and reliable connections to be made. The specific electrical connections made through the related crimp-wire connectors 77 of thirty eight of the forty wiring harness wires are indicated by a two-color and numeric code, as illustrated in FIG. 2 and in the Insert of FIG. 2. The heat-shrink tubing wrapped around specific wire-groupings uses a first color code system to identify each specific group of wires, for example, the groups illustrated are identified as follows group 72 by green, group 73 by red, group 74 by blue, group 75 by yellow, and group 76 by white heat-shrink colored tubing. The second color code system identifies the use to which each wire in a group is put, for example, the wire connector identified as a white connector and as being the number 1 wire in the green group serves as a tachometer input. Individual numbers (1-38) identify each wire. The forty wires of the wiring harness are connected to the 40-pin female plug connector 126 for easy and rapid plugging and unplugging to and from to DAS 20. Wiring harness 100 offers up to 37 channels to connect input signals representing race car performance properties. Additionally, there are two dedicated digital output signals available for interfacing to optional devices such as, a display dash board similar to that of a normal passenger car. It should be noted that twenty of the channels to which signals may be connected are programmable through a web-server as digital input or output signals, analog input signals, or as regulated current source outputs. In other words, the disclosed invention eliminates the need for the limited use dedicated analog or digital signals of presently available systems.

Figure 4:
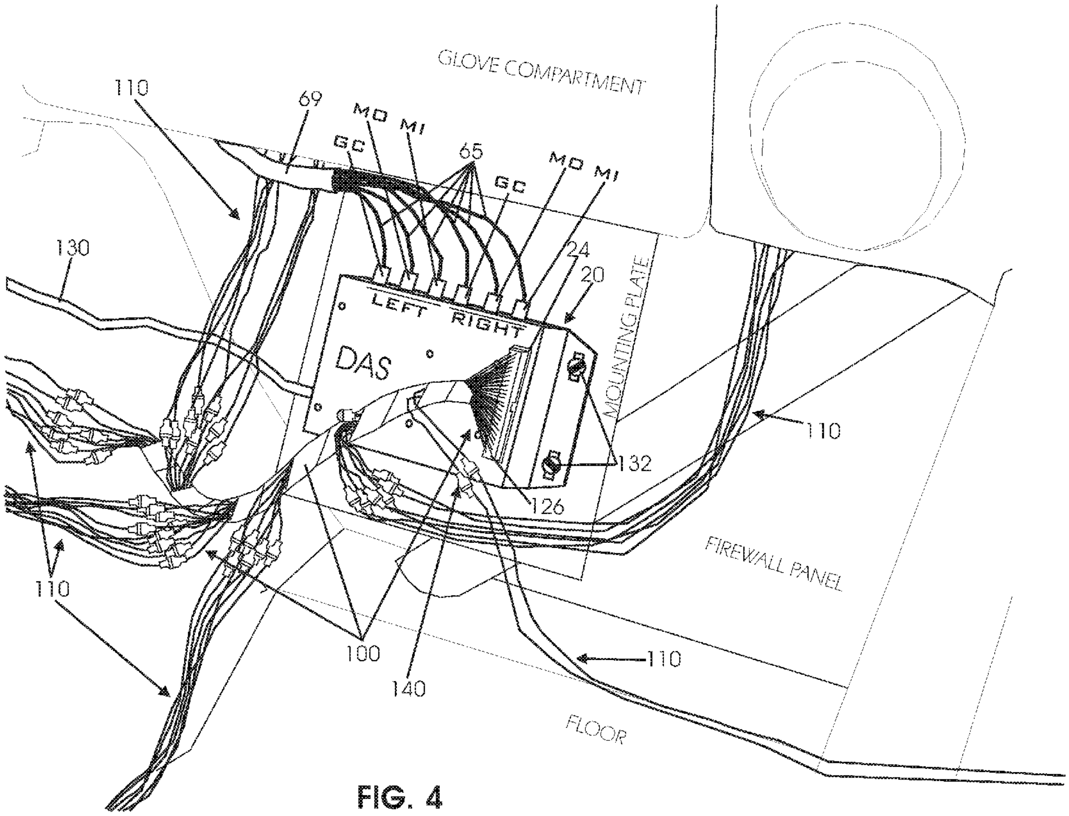
FIG. 4 is a perspective view of a DAS 20, functionally similar to that as illustrated in FIG. 1 and a wiring harness, functionally similar to that illustrated in FIG. 2, connected to each other and mounted beneath a glove box of a vehicle.

Another one of the major advantages of the claimed invention is the use of fiber optic cable 65 to connect header banks 50 to DAS 20 using fiber optic cable terminator connectors 25, as illustrated in FIGS. 1, 3, and 4. Fiber optic cable provides for an increased noise immunity compared to the commonly used metal wires that are susceptible to the affects of local electromagnetic fields (such as external electromagnetic radiation from the automotive ignition system), and thus reduces, if not eliminates, passage of erroneous data. Fiber optic cable provides several additional advantages, including easy installation and termination of the cables (i.e., the fiber optic cable can be cut simply using a sharp blade, which is not possible when metal cable is used), easy and rapid disconnect and reconnect for removal of DAS 20 (as needed) from one vehicle and installation into another, and, importantly, provides for the use of cables that now may be up to 30 feet long for normal operations, verses previous dependence on wire cables having a much shorter, normally measured in inches, operating length. The use of fiber optic cable also provides for a system of cables through which light can be emitted, thus providing for ease of installation that can be accomplished by a single person and for easier and faster troubleshooting.

The claimed invention also provides for five dedicated analog input channels that have a maximum aggregate sampling rate of 32,000 samples per second. Four of these channels can be programmed via the web browser to operate in dual ended (differential) mode or single ended mode or a combination of both. The fifth analog input operates exclusively single ended mode. Accelerometer(s) connects to any of the analog inputs. Such as accelerometers used in tire spin calculations. Dual ended mode provides for the use of higher performance sensors providing for more accurate and faster conversion rates with the simplicity of the web browser user interface. The way the application works in DAS 20 of the claimed invention is unique, in that it provides the hardware capability to simultaneously interact with sensor inputs that are operating at different data conversion rates, and also is able to combine higher and lower speed sensor data for use on the same graph. Additionally, the program of the claimed invention is able to configure each of the channel's hardware parameters, which provides for the use of the data acquisition server and header banks by various users, i.e., the server and header banks can be used by different race cars after initial set up, that is, the program recognizes the properties of each car into which it is installed. The program is able to extend the size of a data array beyond 64 kilobytes and can compress time and date data into a 6-character field which provides the battery powered clock of the microprocessor with the data required for each recording and/or display to be date and time stamped.

Twenty of the 37 channels provided, in this example, for collecting data on a desired race car's performance properties can be programmed as input or output signals, and can also be programmed as either analog input, digital input or output, or regulated current source output. The programming is done with the web browser through a networked PC. In other words, the claimed invention eliminates the need for the limited use dedicated analog or digital signals of presently available systems. The claimed invention also provides for over-voltage and under voltage protection on these twenty analog/digital channels. This means that up to 40 volts and as low as −38 volts present on any of the 20 inputs will not damage DAS 20. Note that 12 volts is the normal operating voltage for a race car. Thus, it is clear that the claimed invention provides for new levels of adaptability and usefulness not previously known.

Currently available systems, using a standard serial peripheral interface bus (SPI bus) design having multiple SPI slave devices, require four SPI signals. Thus, to connect to DAS 20, each header bank 50 would require four separate SPI bus signals. The claimed invention, however, requires only three signals between each header bank 50 and DAS 20 to implement the SPI bus communication. In a currently available system each SPI slave device's chip select signal is controlled by the SPI bus master. The chip select signal requires a signal path from the SPI bus master to SPI bus slave.

Figure 5A:
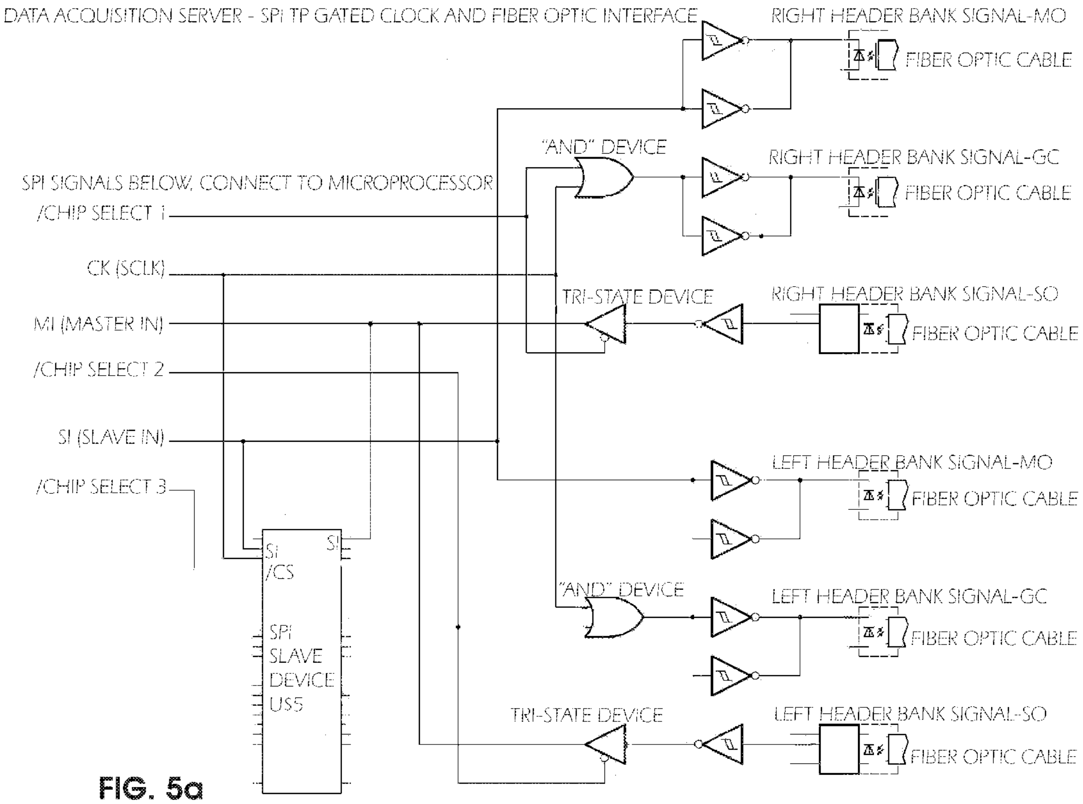
FIG. 5*a* is a schematic diagram of DAS 20—SPI interface adapter.
Figure 5B:
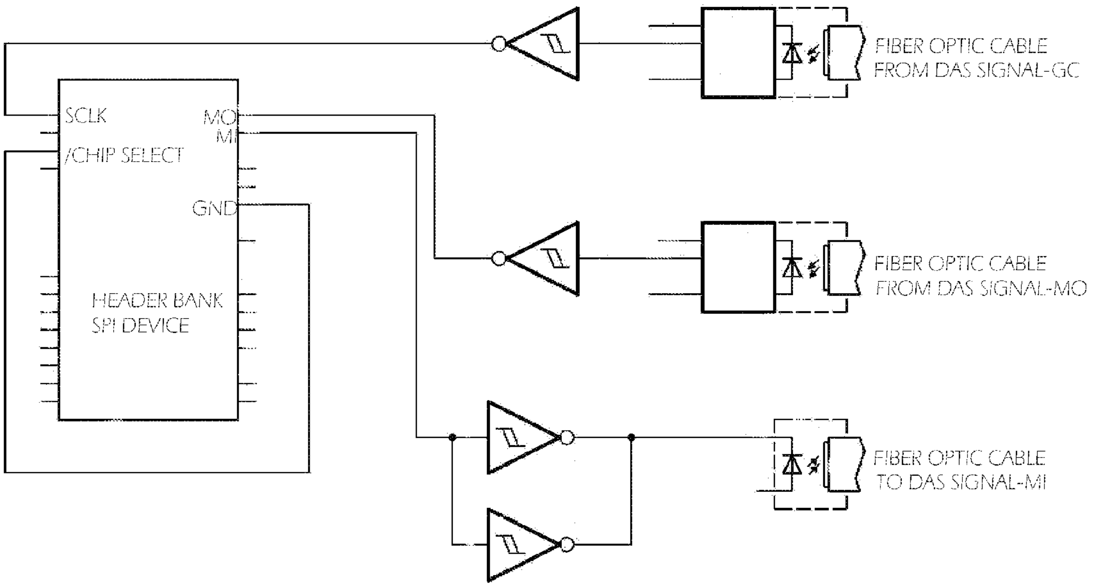
FIG. 5*b* is a schematic diagram of HB—SPI interface adapter.

In the SPI bus implementation scheme of the disclosed invention, as illustrated in FIG. 5*b*, each SPI slave device's chip select signal is continuously and permanently activated. In the SPI bus implementation scheme of the claimed invention, as illustrated in FIG. 5*a*, the SPI bus signals chip select (CS) and clock are combined through a logical "AND" function resulting in an SPI bus clock signal that is gated to be active only when the SPI bus master's chip select and clock signals are active. Each gated SPI clock signal (GC) is connected to a single SPI bus slave device. The attached SPI bus slave device then receives a clock signal thereby selecting it as the only active SPI slave device and communication starts. SPI bus signal MI (master-in) requires a tri-state buffer with a logic control signal to be placed between each SPI bus master and slave device. Each tri-state buffer output signal is connected to the SPI bus MI signal. The tri-state logic control signal is activated by the corresponding SPI bus chip select signal. This forms a multiplexer allowing only the selected SPI bus MI signal to be routed to the SPI bus master device. The use of the tri-state buffer with logic output control as a multiplexer is also considered a part of the gated clock solution.

FIG. 5*a*, a multiplexed SPI to fiber optic interface adapter logic diagram of circuitry located on DAS 20, illustrates the three communication signals between the SPI and each header bank 50; signals MO (master-out), GC (gated clock), and MI (master-in) of the disclosed invention. Because of the GC in conjunction with the multi-plexer design, the number of plastic optical fiber cable links is reduced from four to three for an SPI bus communicating with two or more slave devices. The introduction of this advanced SPI compatible interface into the Data Acquisition System of the claimed invention keeps system design simple; allowing for the use of presently available, high-performance data converters that are equipped with an SPI bus. The reduction of the number of signals required between an SPI bus master device and its connected slave devices is accomplished by connecting the slave chip select CS ( in header bank 50) to a logic state forcing the device to continuously remain in a selected state. The device can then activate the slave out (SO) signal allowing for a continuous visible light signal to emanate from the fiber optic LED MI transmitter, whenever it is powered on. This feature allows a person to easily see signals directly from the transmitter or through the end of an unconnected or connected fiber cable providing for a user to quickly and easily identify a signal for installation or troubleshooting purposes. Thus, the design as taught herein provides for multiple SPI devices (such as, multiple header bands) and SPI device U$5 as illustrated in FIG. 5*a* to share a single SPI bus. (Device U$5 is used for the previously mentioned twenty programmable signals.) The SPI signal clock CK is gated with a logic AND function, with a microprocessor unit (microprocessor unit not shown) control signal designated as a header bank select signal called header bank 50 select right (right header bank 50) HBSEL-R. In this way, the CK is used as a select signal for the HBSEL-R. The corresponding SPI slave out SO signal (from the right header bank 50) is received on DAS 20 and is multiplexed to the shared MPU input through a tri-state control device whose enable is controlled by the HBSEL-R signal, in this case. The circuitry, as just described, is also applied to left header bank 50 with an additional MPU control signal designated header bank 50 select left header bank 50 HBSEL-L and U5SEL for the SPI slave device U$5. Note that U$5 uses its own internal tri-state device with the output connected to the MI signal.

In a currently available Data Acquisition System, the DAS and header banks SPI communication could not function reliably, or at all, if the extended SPI bus signal lengths the claimed invention requires were adopted. SPI bus signal lengths, of currently available systems, are limited to a maximum of several inches depending on the operating speed, node capacitance and other conditions. Running a standard SPI bus at a 30 feet signal length or more would likely not work well, if at all, even under the best of environmental conditions.

Digital communication signal wires such as that of an SPI bus for example, require a high signal to noise ratio to operate reliably. This means the voltage level that represents the SPI bus signal on the wire must be several times larger than any electrical noise signal present on that same wire. If the signal to noise ratio were to fall below a certain threshold level, the communication would certainly and immediately error. A significant concern in any automotive application involving digital communication signals is maintaining a high signal to noise ratio. Vehicular electronic ignition systems develop electromagnetic energy that propagates through space. When this energy intersects a wire, a noise voltage is developed in that wire. This decreases the signal to noise ratio and can cause errors. In a race car, the amount of electromagnetic energy causing noise voltages in wires is multiplied several times. This is due to the higher amounts of energy produced in the race car ignition system, especially in a drag race car. This furthers the concern and potential for a poor signal to noise ratio with digital communication wire.

The paragraphs above described independent engineering difficulties that have been eliminated by the claimed invention. The first concerns the operating length of digital communication signal wires operating between an SPI bus master and SPI bus slave device, and the second, the likelihood of a low signal to noise ratio in that wire. Another concern is providing for a connection that enables header banks to be connect ed to, and disconnected from, DAS 20 easily and rapidly and to ensure that DAS 20 is portable, that is, that DAS 20 is easily moved from race car for use in another race car.

The claimed invention overcomes these separate problems by using a fiber optic cable connection in place of copper wire to connect SPI bus master and slave devices together through the gated clock solution previously discussed. Electronic digital communication signals within DAS 20 and header bank 50 are converted to a visible red light signal, 660 nanometer wavelength. This light signal travels through the fiber optic cable to its DAS 20 or header bank 50 destination. The light signals are then converted back to an electronic signal. Light signals traveling through a fiber optic cable enable excellent signal to noise ratios to be consistently maintained. Race car ignition systems have no effect on the fiber optic signals. By carefully selecting which fiber optic devices to use, a simple locking action can be achieved to firmly hold the fiber optic cable in position within DAS 20 and header bank 50. The simple locking capability also means that unlocking the cable from DAS 20 and header bank 50 is equally simple. DAS 20 (or header bank) connected fiber optic cable must first be unlocked for disconnecting, before moving it to another race car.

Transmitting signals through fiber optic cables provides additional advantages, including: signals are fully immune to electrical and magnetic interference, SPI bus master and slave devices that can be completely electrically isolated, having visible light signals in the fiber optics cables that make troubleshooting simple, safe installation of the system near high voltage levels and high current devices, inability of signals to arc making it safe for use near explosive fuels, and cables that are light weight, durable, easy to handle and to terminate.

Analog signals of the disclosed invention use electrical voltage to convey the signal's information. Thus, its primary disadvantage is that it can suffer losses of information due to the presence of noise—i.e., random variations of the signal. The Nyquist-Shannon sampling theorem states that perfect reconstruction of a signal is possible when the sampling frequency is greater than twice the maximum frequency of the signal being sampled. If lower sampling rates are used, the original signal's information may not be completely recoverable from the sampled signal. Another advantage of higher sampling rates is that they can relax the low-pass filter design requirements for ADCs and DACs. The differential analog input and sensor can be used as needed to reduce the effects of noise. Therefore, the claimed invention provides for dual variable analog sampling speeds up to 16,000 and 32,000 per second.

Digital signals, too, are affected by noise, and although they are usually not affected as severely as analog signals, the claimed invention provides for digital signal filtering. Header band thermocouple input signals are processed in the digital domain under program control then transmitted via fiber optic link to DAS 20. All channels programmed to accept digital signals are bidirectional, that is, they can be used to either input or output desired information. As inputs, these are also filtered signals with dedicated hardware.

A dual axis accelerometer, used by the disclosed invention, measures cornering (lateral "G" force) acceleration and braking (longitudinal "G" force) at the same time. Velocity and acceleration values can be measured while the vehicle is being driven, using acceleration data from the invention's external accelerometer. The dual axis accelerometer can be used in place of the single axis accelerometer previously described to also determine tire spin. Dual axis accelerometers connect to the wire harness (blue group) analog inputs.

FIG. 3, a perspective view, illustrates two header banks 50 mounted inside a race car engine compartment. The header banks are installed proximate to the head of the engine. Cables 60 serve as a twelve volt power cable input. Lead lines 62 indicate sensor cables going from each header bank 50 back toward the exhaust manifold to signal the exhaust gas temperature. Data collected by the two sensors is transmitted from the sensors to the header banks via cables 67. Note that the two devices depicted with the word "sensors" can be most any type of sensor with an operating voltage between 0.5 volts and 4.5 volts. DAS 20 inside the vehicle via fiber optic cables 65, illustrated as protected by cable sleeve 69, which in this example is a Hilec sleeve. The wires of the wiring harness are passed from the engine cavity to DAS 20 to the interior of the car through a provided pass-through.

FIG. 4, a perspective view, illustrates DAS 20 mounted proximate to the glove box inside a race car. Female plug connector 126 of wiring harness 100, is illustrated plugged into DAS 20 master connector jack 24. Fiber optic cables 65, protected by protective sleeve 69, carry signals from the header banks 50 to DAS 20, as illustrated in FIG. 3. FIG. 4 show DAS 20 detachably attached to, for example, a mounting plate of a vehicle using quick release screw fasteners 132 for easy and rapid attachment and detachment. Data collected via wiring harness sensors, signals, and power wires 110 is received, processed, and stored (as for example, in an MPU) until the data is ready for analysis. Power and ground input 140 is required to power DAS 20. The data stored in DAS 20 may be relayed via integrated Ethernet cable 130 to a PC or network for analysis.

The software of the claimed invention consists of a program that enables a user to set the I/O properties of the sensors and to collect, store, processes, and deliver data to a web-browser for analysis and real-time display. The program is divided into sub-routines. One of the sub-routines is for setting up a given sensor and is referred to as "User Sensor Setup Form."

Figure 9:
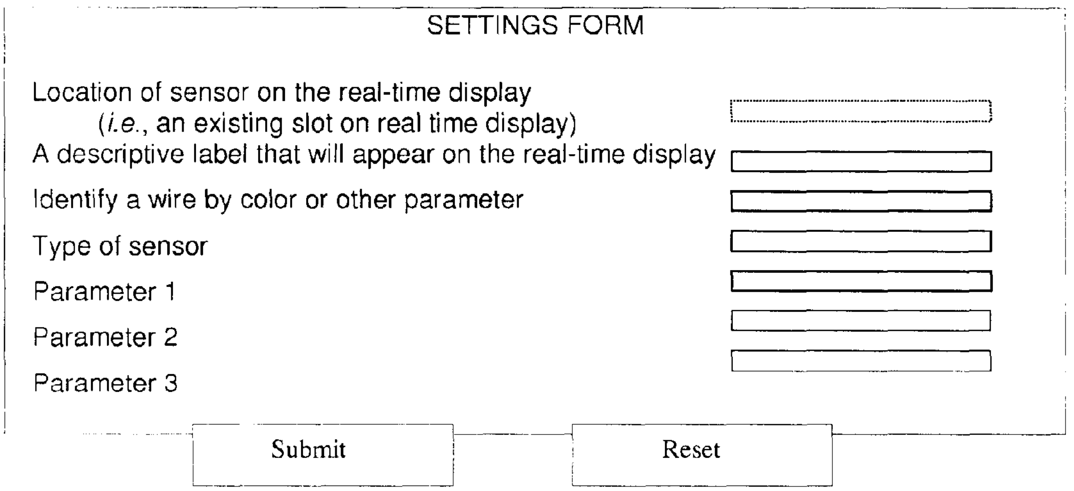
FIG. 9 illustrates an example of a "User Sensor Setup Form".

Shown diagrammatically in FIG. 9 is an example of a "User Sensor Setup Form" that appears on a computer monitor display screen. A user calls up this screen by selecting one of the channels from the channel list, which contains a list of all the channels provided by the Data Acquisition System. The settings form will then appear on the screen and will look similar to the example given. This form provides for a user to input the data that the program requires for the main program of the Data Acquisition System to function. To enter data into the program i.e., to edit the settings, the program must first ascertain that the program is in "Edit" mode; if it is not yet in "Edit" mode, the program stops any data capture and goes into "Edit" mode. The user can still navigate around the various web pages while the program remains in "Edit" mode. The user can tell if the program is in "Edit" mode because, if it is, the top of each web page will mention that it is in "Edit Mode". Because the program now is in the "Edit" mode the user can enter the input data for a desired sensor "S" into the "Settings Form" query boxes that are displayed on the query page displayed on the screen. The user aborts "Edit" mode by restarting the collector using the "Discard settings and restart the collector" command. Once the settings form has been completed and submitted or "Edit Mode" aborted, real-time displays of the data being collected by the selected sensor will be shown on the screen.

Please refer to FIG. 5*a*, a schematic diagram of DAS 20—SPI interface adapter, and FIG. 5*b*, a schematic diagram of HB—SPI interface adapter for additional details of circuitry.

Figure 6:
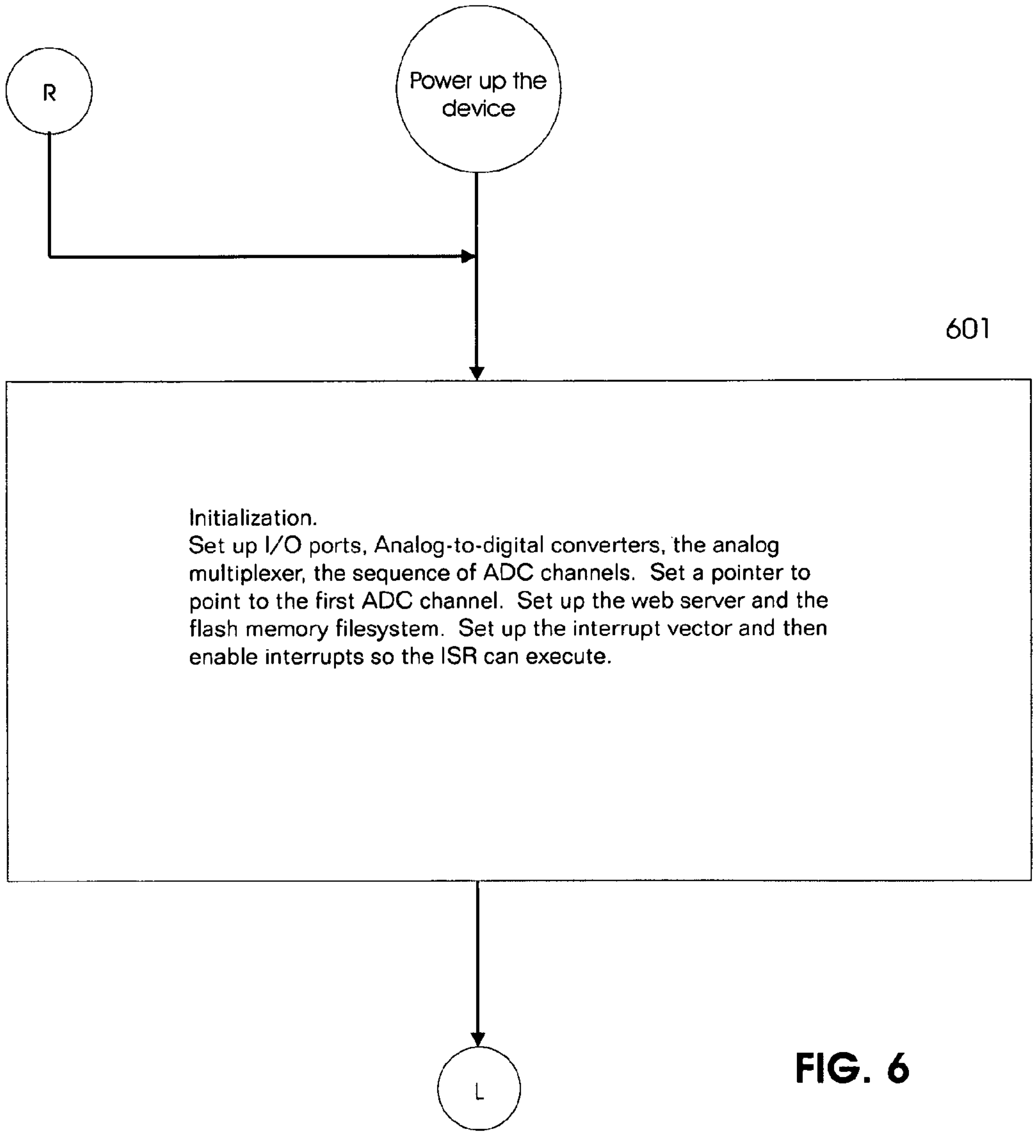
FIG. 6 is a flowchart illustrating a main program setup plan.
Figure 6B:
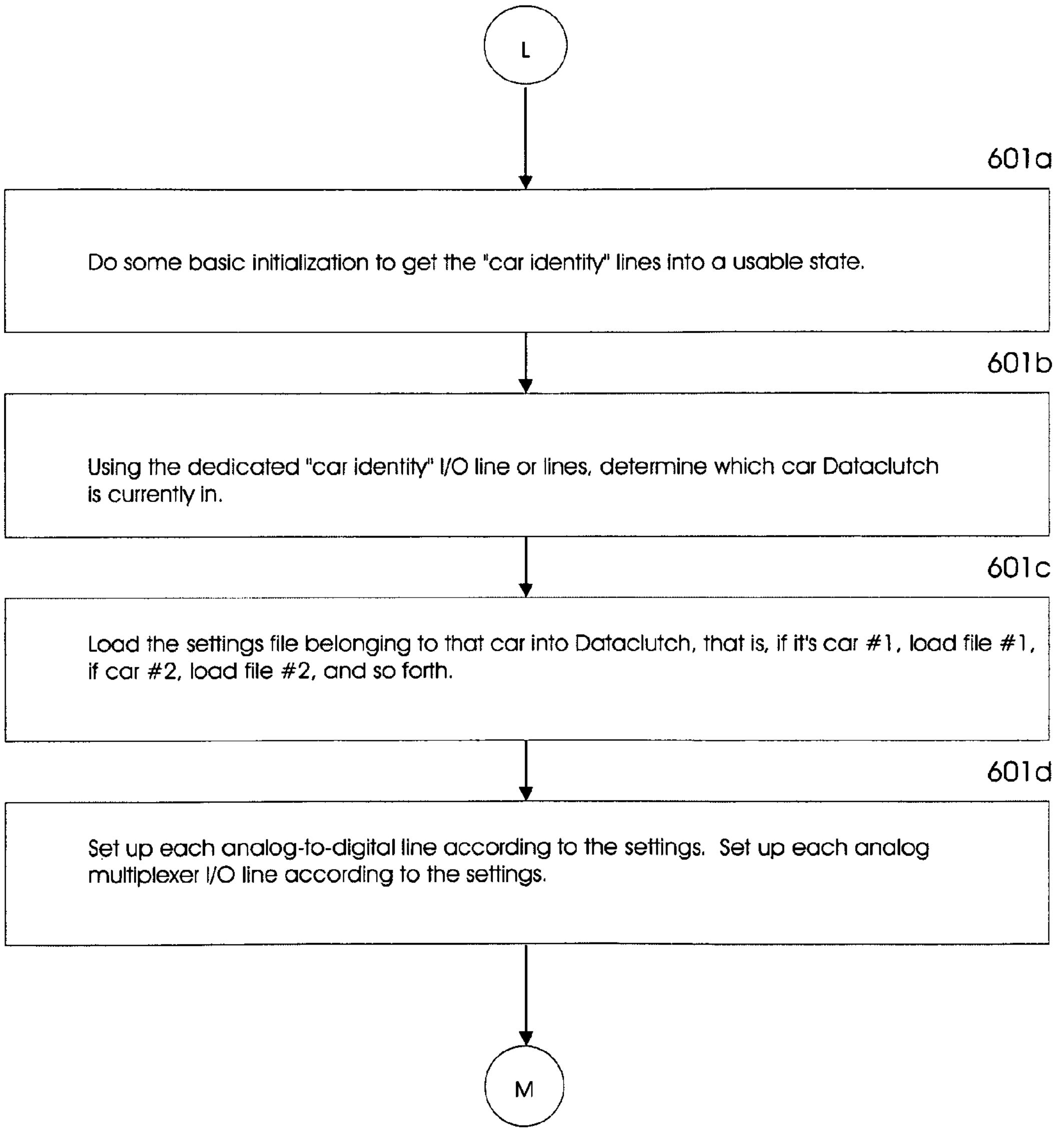
FIG. 6*b* is a continuation of the flowchart FIG. 6.

FIG. 6 and continuing on FIG. 6*b* is a flowchart of the steps involved in initializing a desired race car by entering information relating to the car's wiring, sensors, and settings into the program according to the principles of the claimed invention. Each car has dedicated "car identity" I/O line or lines and each car's wiring pattern corresponds to a number that represents that given car. The initialization process begins each time the program starts or restarts by enabling the "Interrupt Service Routine" (ISR) 601 that instructs the program doing initialization, such as the steps that follow, to get the "car identity" lines to a usable state. The program then determines in which car the data processing system is installed 601*a* and 601*b* and then loading the settings file belonging to that car 601*c*. The system is now ready to be initialized 601*d* by the Main Program (M as shown of FIG. 6*b*) of the data acquisition system.

Figure 6C:
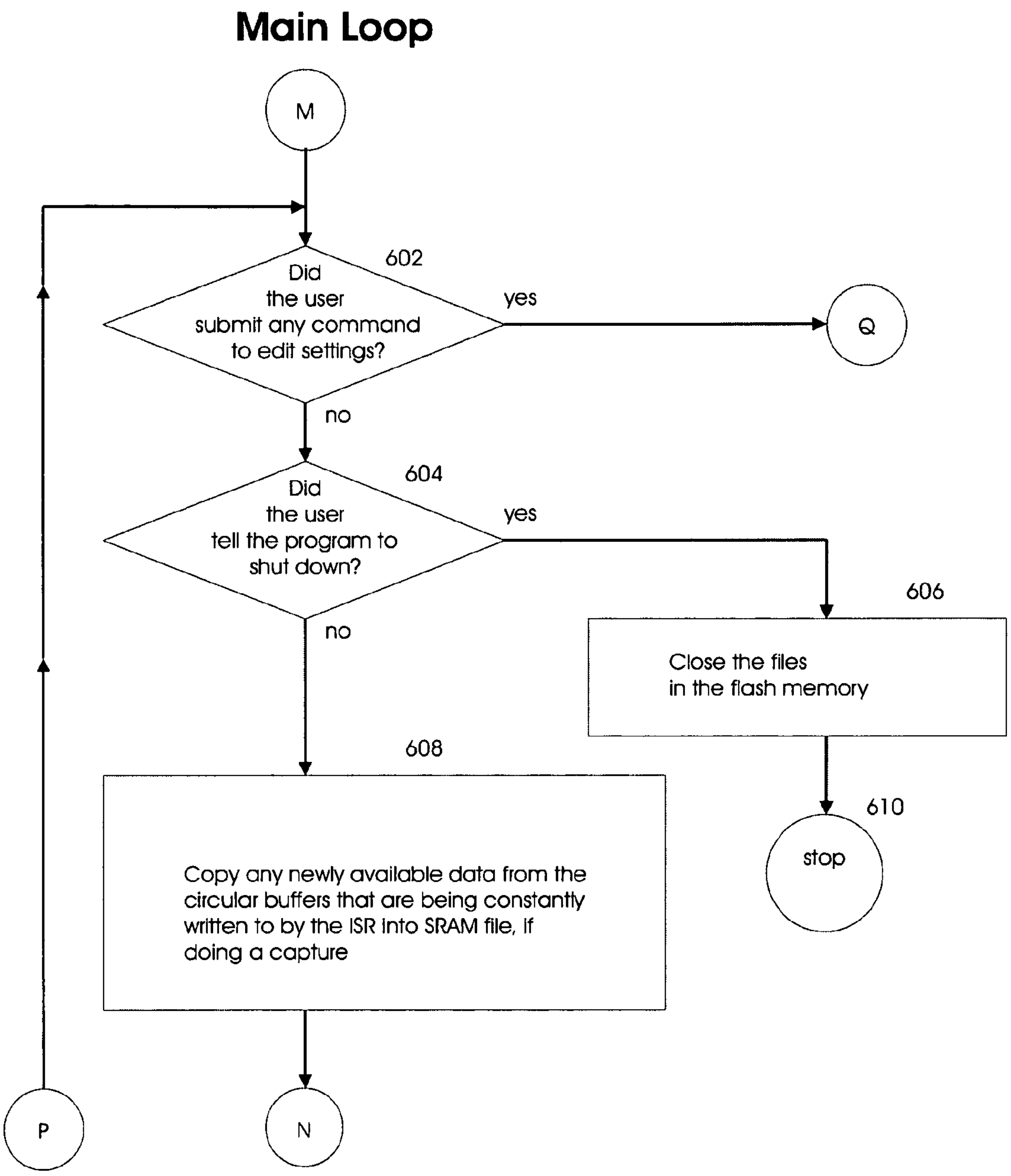
FIG. 6*c* is a flowchart diagram illustrating the main loop of the program started in FIG 6.
Figure 6D:
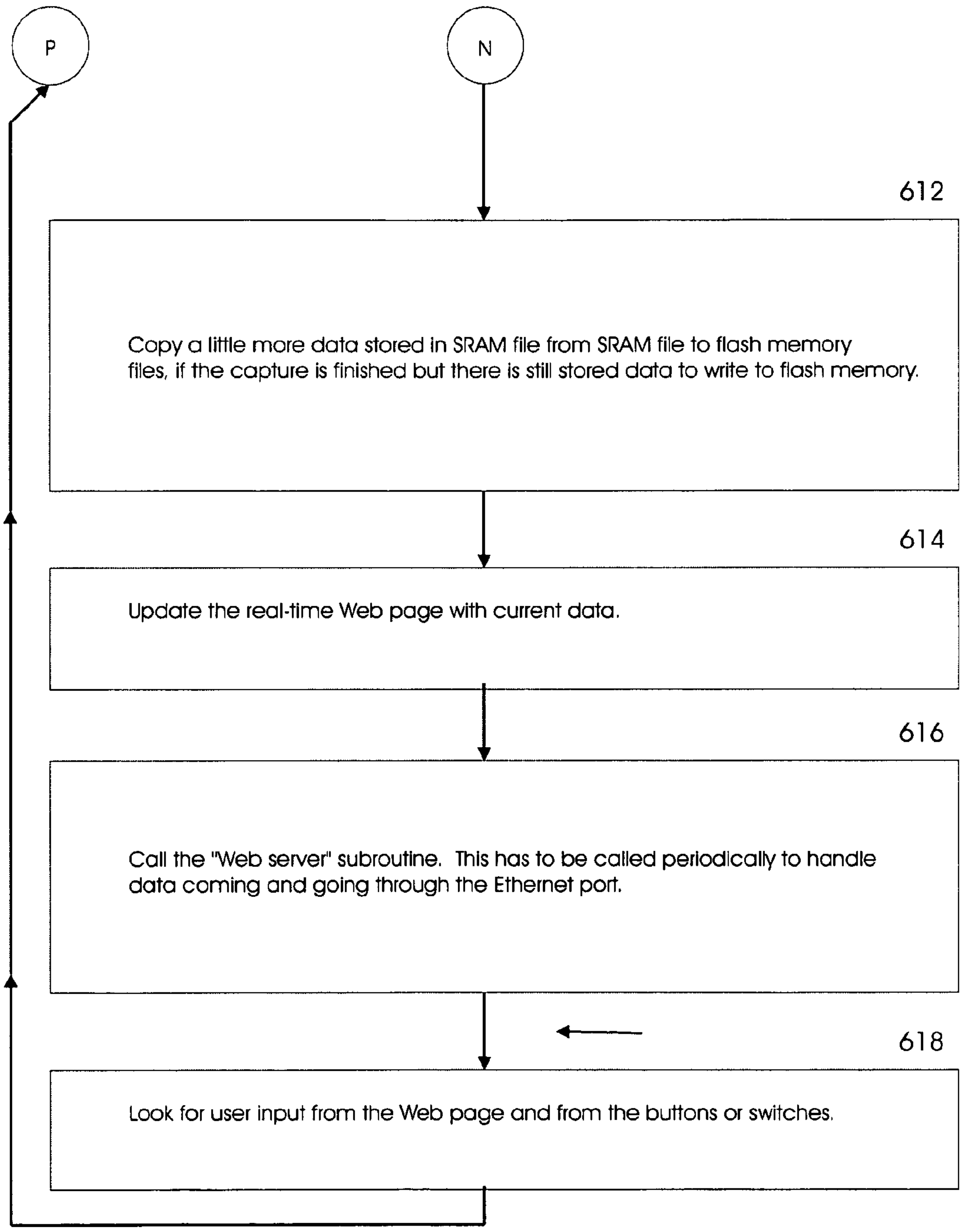
FIG. 6*d* is a continuation of the flowchart FIG. 6*c*.
Figure 6E:
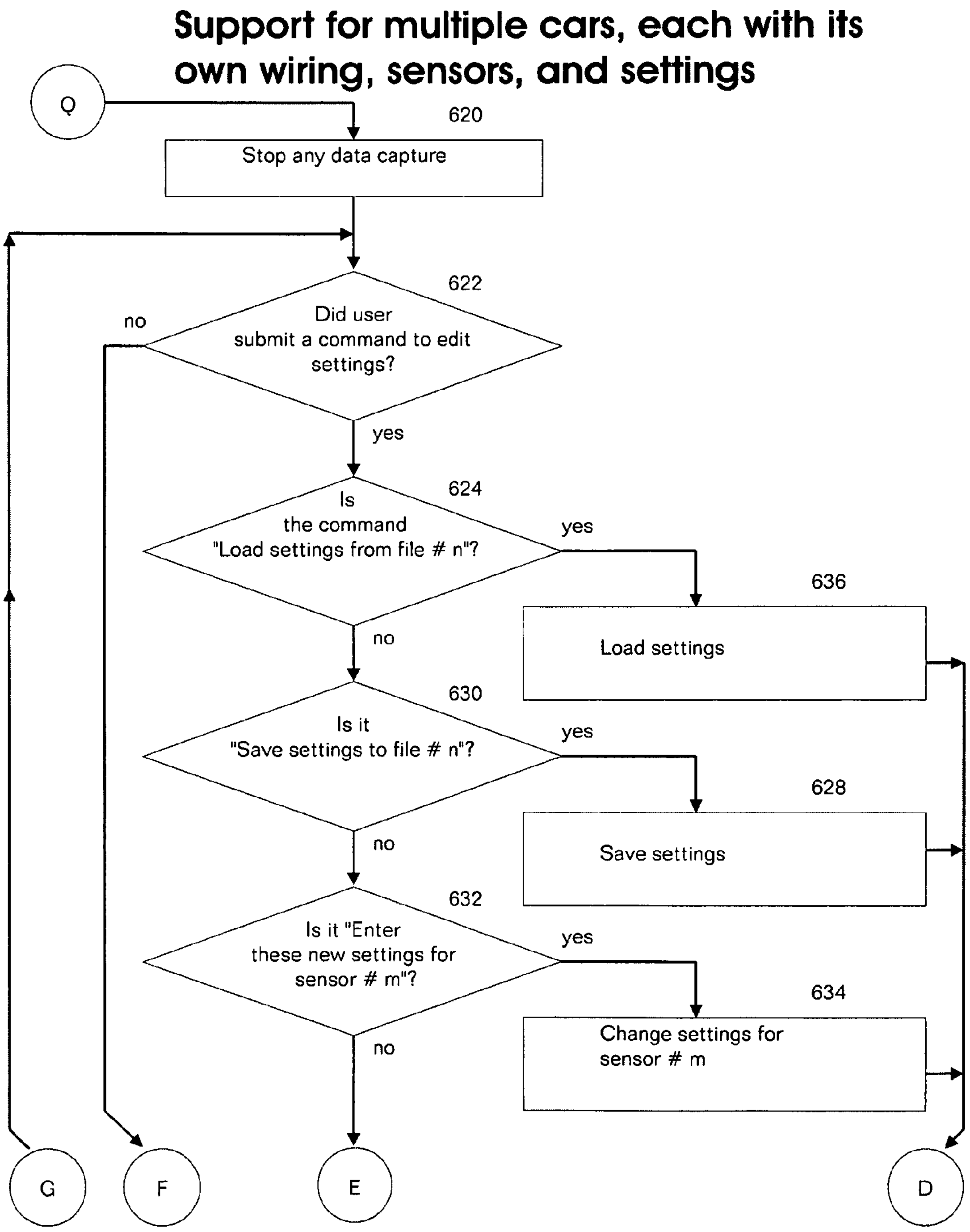
FIG. 6*e* is a continuation of the flowchart started in FIG. 6.
Figure 6F:
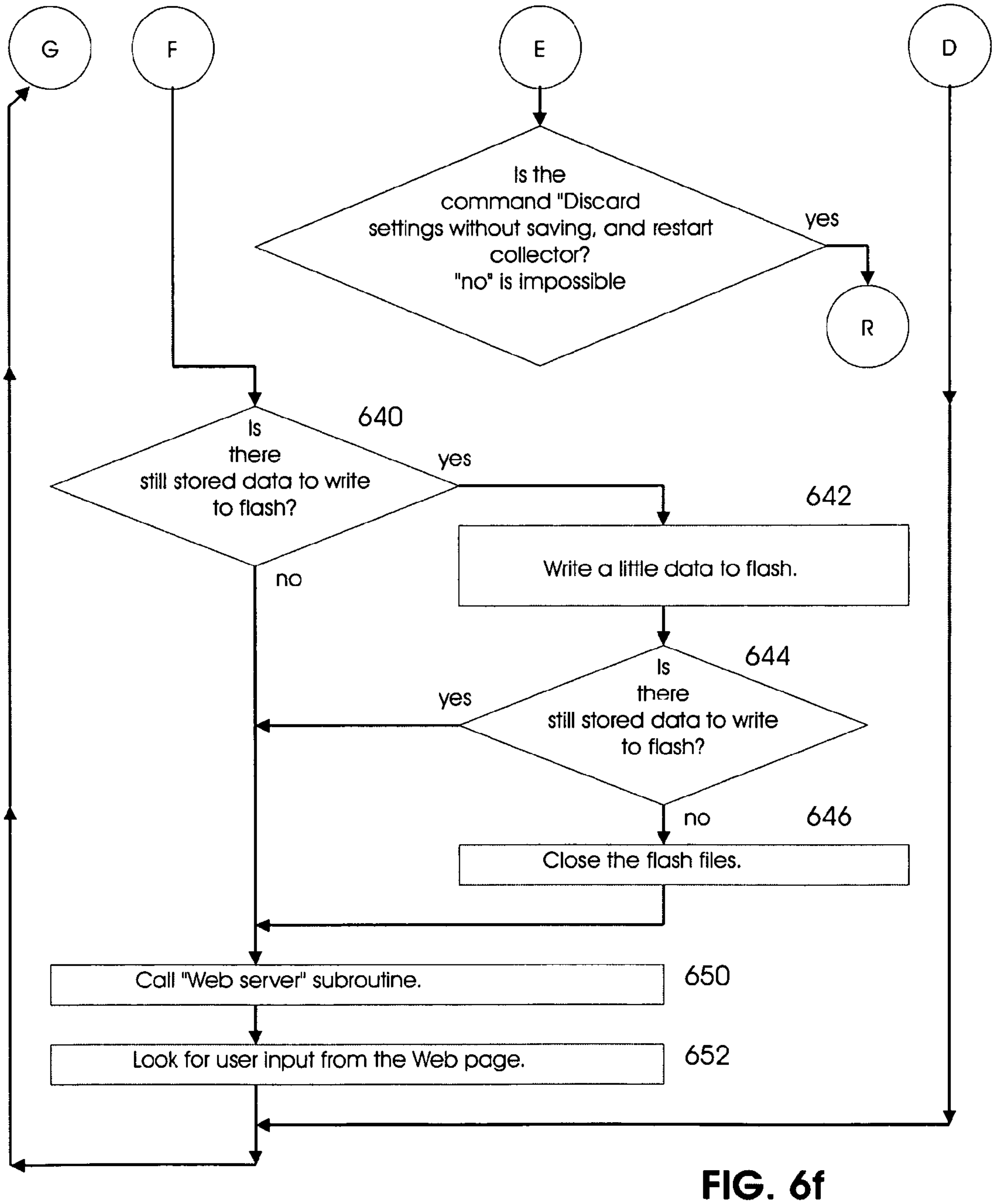
FIG. 6*f* is a further continuation of the flowchart started in FIG. 6.

FIG. 6*e* and FIG. 6*f*, a flowchart, illustrates the subroutine that is used by the program to process a user command (as asked in FIG. 6*e*, Box 622) such as "Load Setting" from file No. n 624. The user gives the program a command (either "Load Set-tings File", "Save Settings to File", "Edit Settings for a Channel", or "Discard Settings and Restart Collector"). The user also, if necessary, identifies by number which file or, by selecting from the list of channels, which channel is to be processed. For example, there are eight files, numbered 1-8. If the command is to "Load Settings" from File No. n, the settings are loaded 626 and the program returns it to the sub-routine of FIG. 6*e*. If the command is not "Load Settings" from File No. n 624 the program examines the command to know is determine if it is to "Save Settings" to File No. n 630, if the command is to "Save Settings" to File No. n, the settings are saved 628, if the command is not to "Save Settings" to File No. n, the program examines the command to determine if it is to "Enter these New Settings" for Sensor No. m 632. If the command is to "Enter these New Settings" for Sensor No. m, then the settings are changed for sensor No. m 634. If the command is not to "Enter these New Settings for Sensor No. m", then the program goes to E of FIG. 6F where the program examines the command to determine if the command is to "Discard Settings" without saving and restart collector (note that an answer of "no" is impossible). If the reply is "yes", the routine is routed to "R" which will restart the device and turn on the power as indicated in FIG. 6.

Also in FIG. 6*e* and FIG. 6*f* is a flowchart of the program steps involved when a user does not submit any commands to the main program of the Data Acquisition System. Once a user submits one of the commands found in FIG. 6*e* breaking out of the main program loop, data capture is stopped 620 of FIG. 6*e*. The program then wants to know if the user submitted a command to edit settings 622 of FIG. 6*e*, if user did submit a command to edit settings, the routine goes to 624 of FIG. 6*e*. If user did not submit a command to edit settings, the routine needs to know if there is still stored data to write to flash memory 640. If there is still stored data to write to flash memory, then write either all the remaining stored data or approximately eighty bytes, whichever is smaller, to flash memory 642. Again, the program needs to know if there still stored data to write to flash memory (644). If there is no stored data to write to flash memory, then the program will close the flash files (646) and call the "Web Server" routine (650) and looks for user input form the web page (652) and sends the program to "G" of FIG. 6*e*.

FIG. 6, as mentioned above, is a flowchart of the Main Program of the Data Acquisition System. Once the device is powered, it must be initialized, as in Box 601. This is accomplished by setting up the input/output (I/O) ports, digital to analog converters, multiplexer, and the sequence of ADC channels. Next, a pointer must be set up to point to the first ADC channel. Then the web-server and the flash memory file system are set up, along with the interrupt vector (which serves as a pointer to a memory location) so that ISR can execute. At this point the program moves on to L of FIG. 6*b*.

FIG. 6*b* continues the flowchart of FIG. 6 where Box 601*a* instructs the program doing some basic initialization, such as the steps that follow, to get the "car identity" lines to a usable state. The program uses the dedicated "car identity" line or lines to determine which car the DAS 20 is in (601*b*). The program then will load the settings file belonging to the identified race car (601*c*) and set up each analog-to-digital line according to the settings. At this point the program will also set up each multiplexer I/O line according to the settings. The program then moves on to the main loop of the program as illustrated in "M" of FIG. 6*c*.

As illustrated in Box 602, FIG. 6*c*, the program ascertains if the user submitted any command to edit the settings. If the user did submit a command to edit the settings then program goes to "Q" (refer to FIG. 6*e*). If the user did not submit a command to edit the settings then program ascertains if the user tells the program to shut down (Box 604, FIG. 6*c*) and if yes, the user did tell the program to shut down, the program moves on to the step given in Box 606 of FIG. 6*c* instructing the closure of the files in the flash memory and the program step illustrated in Box 610 gives the order for the program to "stop". If the user wants to keep the program running (the other program option in Box 604), Box 608 provides the opportunity for the program to copy any newly available data from the circular buffers that are being constantly written to by ISR into SRAM file if the program is doing a capture.

The program then moves on to the steps denoted "N" of FIG. 6*d* where Box 612 has the program copying a little more data stored in the SRAM file to flash memory files if the capture is finished but knowing that there is still more stored data to write to flash memory. The next step is for the program to update the real-time web page with current data Box 614. Box 616 has the program call the "Web Server" routine, which must be called periodically to handle data coming and going through the Ethernet port. The program then looks for user input from the web page and from the buttons or switches Box 618. The program then moves on to "P" which takes the program back to the main loop "M" of FIG. 6*c*.

If, the main loop (referred to as "M" in FIG. 6*c*) the user did submit a command to edit the settings and the program went to the steps illustrated in "Q" of FIG. 6*e* where, as illustrated in Box 620 the program stops any data capture. The program then must ascertain if the user submitted a command to edit settings Box 622. If the user did not submit a command to edit settings, the program jumps "F" of FIG. 6*f*. If the user did submit a command to edit settings, then the program examines the command to determine if the command is to "Load Settings" from File No. n 624. If the command is to "Load Settings" from File No. n, the settings are loaded 626 and the program goes to D which returns it to the sub-routine of "G" of FIG. 6*e*. If the command is not "Load Settings" from File No. n the program examines the command to determine if the command is to "Save Settings" to File No. n 630, if the command is to "Save Settings" to File No. n, the settings are saved 628 and the program goes to D which returns it to the sub-routine of "G" of FIG. 6*e*. If the command is not to "Save Settings" to File No. n, the program examines the command to determine if the command is to "Enter these New Settings" for Sensor No. m 632. If the command is to "Enter these New Settings" for Sensor No. m, then the settings are changed for sensor No. m 634 and the program goes to D which returns it to the sub-routine of "G" of FIG. 6*e*.

If the command is not to "Enter these New Settings" for Sensor No. m, the program goes to E of FIG. 6*f* where the program examines the command to determine if the command is to "Discard settings without saving and restart collector?" (Note that an answer of "no" is impossible.) An answer of "yes" takes the program to "R" which is to power up the machine again as indicated on FIG. 6.

FIG. 6*f* also illustrates the part of the program, referred to as "F", which has the program ascertain whether there is still stored data to write to flash memory (640). If there is no more stored data to write to flash memory, the program calls the "Web Server" routine 650 and looks for user input form the web page 652 and sends the program to "G" of FIG. 6*e*. If there is more stored data to write to flash memory, Box 642 has the program write either all the remaining stored data or approximately eighty bytes, whichever is smaller, to flash memory. Box 644 again ascertains if there is still stored data to write to flash, if there is the program goes to 650 (thus, the program arrives at 650 whether or not there is still stored data to write to flash). If there is not, then the program goes to 646 closes the flash memory files and heads toward 650.

Figure 7:
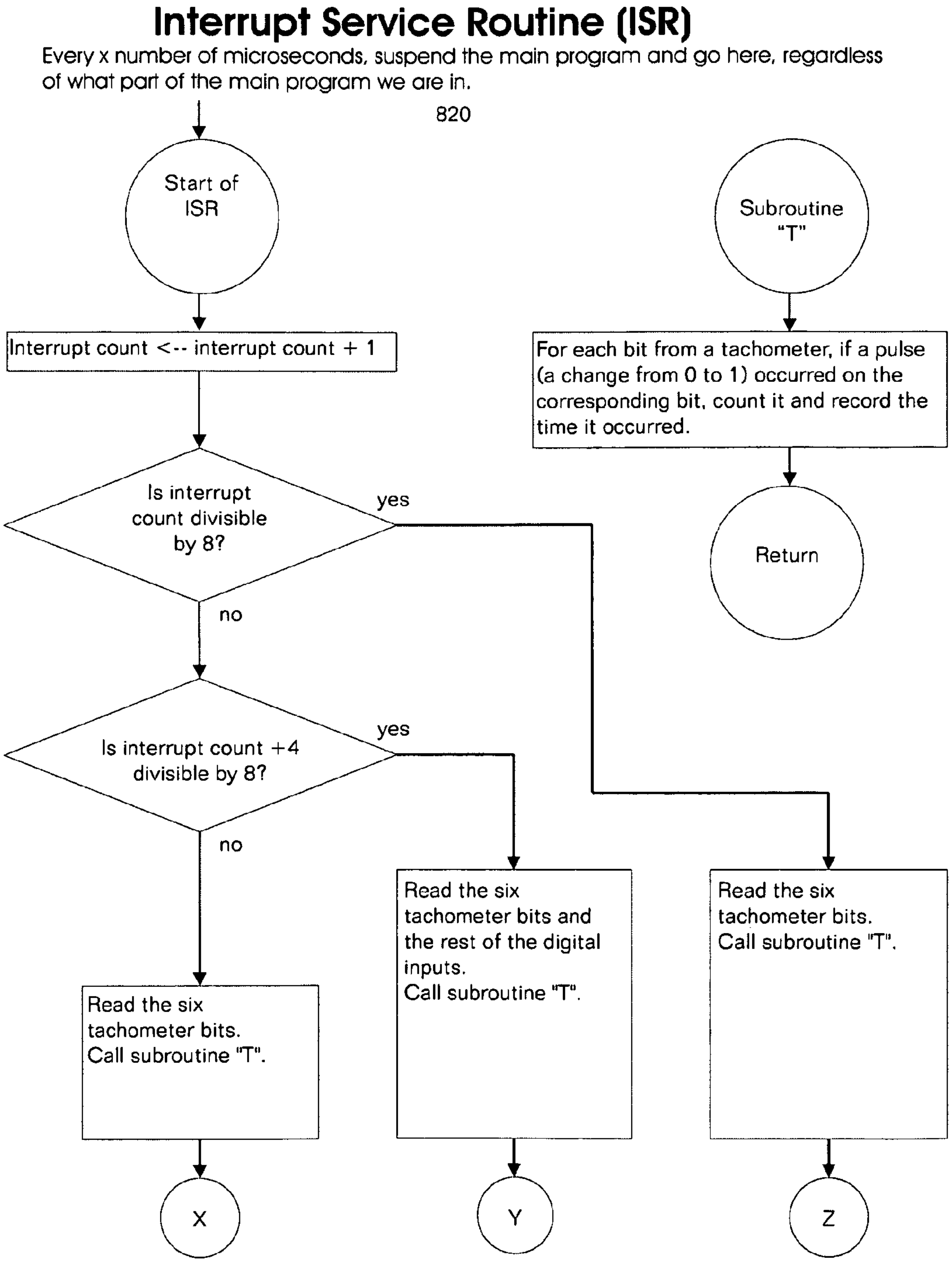
FIG. 7 is a flowchart diagram illustrating the Interrupt Service Routine steps.
Figure 8:
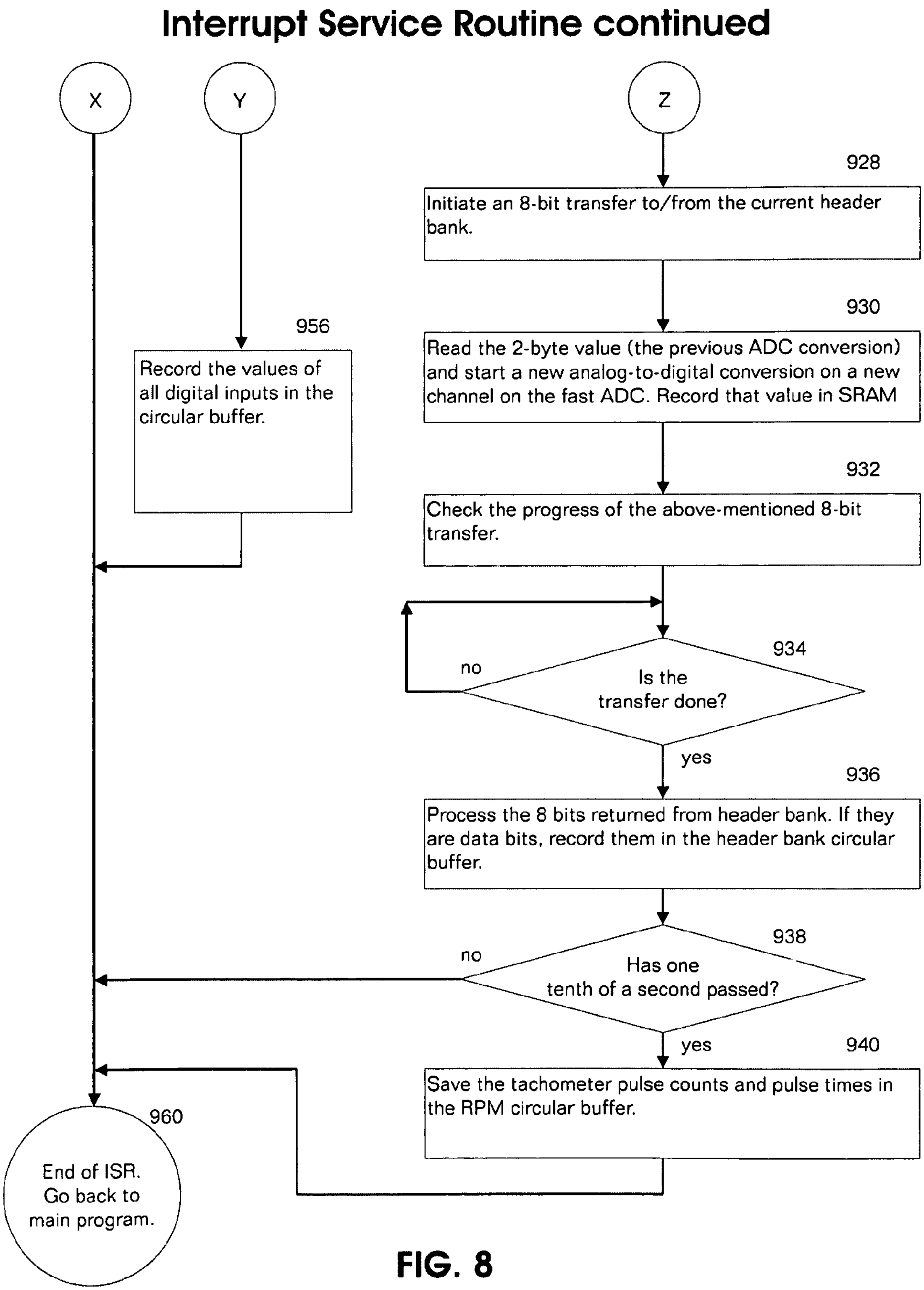
FIG. 8 is a continuation of the flowchart FIG. 7.

FIG. 7 illustrates the general steps of the INTERRUPT SERVICE ROUTINE (ISR). Every X number of micro-seconds the program goes to the ISR Routine regardless what part of the main program is being run 820. The number of times the program has gone to the ISR since power was applied is the "interrupt count". The program keeps track of this by adding 1 to the "interrupt count" here. 822. The program then ascertains if the interrupt count is divisible by eight 824. If the interrupt count is divisible by eight, then the program reads the six tachometer bits and calls Subroutine T 826, then when it reaches the "Return" in Subroutine T, it goes to "Z" of FIG. 8. If the interrupt count is not divisible by eight, then the program needs to ascertain if the interrupt count plus four is divisible by eight 850. If it is then the program reads the six tachometer bits and the rest of the digital inputs and calls Subroutine "T", then when it reaches the "Return" in Subroutine T, it goes to "Y" of FIG. 8. If the interrupt count plus four is not divisible by eight, then the program reads the six tachometer bits and calls Subroutine "T" 852, then when it reaches the "Return" in Subroutine T, it goes to "X" of FIG. 8.

Subroutine T 880 For each bit from a tachometer, if a pulse (a change from 0 to 1) occurred on that bit, count it and record the time it occurred 882. Return (884). End of Subroutine T.

FIG. 7 continues to illustrate the general steps of the INTERRUPT SERVICE ROUTINE (ISR). "Z" instructs the program to Initiate an 8-bit transfer to/from the current header bank 50, 928 and then read the 2nd byte value and start a new analog-to-digital conversion on a new channel on the fast ADC and record that value in SRAM file 930. The program must then check the progress of the above mentioned 8-bit transfer 932 and then ask if the transfer is done? 934. If not, loop back to 934. If yes, process the 8-bits returned from header bank 50; if they are data bits, record them in the header bank 50 circular buffer 936. Has one-tenth second passed? 938. If no, Go to "X" which ends the ISR and goes back to the main program 960. If yes, save the tachometer pulse count and pulse times in the RPM circular buffer 940 and then go to "X" which ends the ISR and goes back to the main program 960. "Y" instructs the program to record the values of all digital inputs in the circular buffer and then to go to "X" which ends the ISR and goes back to the main program 960.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the claimed invention is not limited to the described methods, embodiments, features or combinations of features but include all the variation, methods, modifications, and combinations of features within the scope of the appended claims. The invention is limited only by the claims.

What is claimed is:

1. A data acquisition system, comprising:

components communicatively connected to form a data acquisition system, said components comprising:

at least one apparatus for obtaining exhaust parameters of an engine, at least one wiring harness for obtaining real-time performance parameters of the engine, at least one data acquisition server (DAS) detachably attachable to a selected mounting location, said DAS electronically coupled and detachably attachable to said apparatus for obtaining exhaust parameters and to said wiring harness, said wiring harness capable of identifying the engine to said DAS, and a fiber optic cable communicatively connecting said DAS and said means for collecting engine exhaust parameters, said components are communicatively connected to a SPI BUS having a master device and multiple SPI slave devices, said SPI Bus having only a three-signal connection that supports said one master device and several connected slave devices, and said SPI Bus having bus signals chip select and clock out, where said signals chip select and clock out are combined through a logical "AND" function providing for a SPI bus gated clock signal to be active only when the SPI bus master's chip select and clock out signals are active.

2. The data acquisition system, as recited in claim 1, said components each further configured to be a receiver and a transmitter.

3. The data acquisition system, as recited in claim 1, wherein said DAS is sized to fit into the palm of a hand.

4. The data acquisition system, as recited in claim 1, wherein said wiring harness has a plurality of wires each having one end electrically connected to a signal source for obtaining the performance data and the other end electrically connected to said wiring harness.

5. The data acquisition system, as recited in claim 4, wherein each of said wires electrical connections are identified by a first identifying code, a second identifying code, and a third identifying code.

6. The data acquisition system, as recited in claim 4, wherein a select number of said signals identify the engine to which said wiring harness is connected via said DAS.

7. The data acquisition system, as recited in claim 4, wherein a select number of said wires provide an LED light signal.

8. The data acquisition system, as recited in claim 4, wherein a select number of channels to which said sensors are connected are programmable through a web-server as digital input or output signals, analog input signals, or as regulated current source outputs.

9. The data acquisition system, as recited in claim 1, wherein said communicatively connecting fiber optic cable may be up to 30 feet in length.

10. The data acquisition system, as recited in claim 1, wherein said gated SPI clock signal is connected to a single SPI bus slave device.

11. The data acquisition system, as recited in claim 10, wherein said connected SPI bus slave device receives a clock signal selecting it as the only active SPI slave device.

12. The data acquisition system, as recited in claim 11, wherein said connected SPI bus signal master-in requires a tri-state buffer with a logic control signal to be placed between each SPI bus master and slave device, said tri-state buffer output signal is connected to said SPI bus master-in signal, and said tri-state logic control signal is activated by the corresponding SPI bus chip select signal forming a multiplexer allowing only the selected SPI bus master-in signal to be routed to the SPI bus master device.

* * * * *